US012521903B2

(12) United States Patent
Koh et al.

(10) Patent No.: US 12,521,903 B2
(45) Date of Patent: Jan. 13, 2026

(54) AUTOMATIC CUSHION-ATTACHING DEVICE

(71) Applicant: SEOUL D&S CO., LTD, Kyeong-gi-do (KR)

(72) Inventors: Bok Kyu Koh, Seoul (KR); Chul Jong Won, Seoul (KR); Man Sik Jo, Kyeong-gi-do (KR); Sang Moo Lee, Kyeong-gi-do (KR)

(73) Assignee: SEOUL D&S CO., LTD, Kyeong-Gi-do (KR)

( * ) Notice: Subject to any disclaimer, the term of this patent is extended or adjusted under 35 U.S.C. 154(b) by 813 days.

(21) Appl. No.: 17/621,437

(22) PCT Filed: Feb. 3, 2020

(86) PCT No.: PCT/KR2020/001573

§ 371 (c)(1),
(2) Date: Oct. 3, 2022

(87) PCT Pub. No.: WO2021/085749

PCT Pub. Date: May 6, 2021

(65) Prior Publication Data

US 2023/0020992 A1 Jan. 19, 2023

Related U.S. Application Data

(63) Continuation-in-part of application No. 15/904,073, filed on Feb. 23, 2018, now Pat. No. 11,235,488.

(30) Foreign Application Priority Data

Oct. 31, 2019 (KR) ........................ 10-2019-0138193
Nov. 14, 2019 (KR) ........................ 10-2019-0145541

(Continued)

(51) Int. Cl.
*B26D 7/27* (2006.01)
*B05C 5/02* (2006.01)
(Continued)

(52) U.S. Cl.
CPC .............. *B26D 7/27* (2013.01); *B05C 5/0208* (2013.01); *B05C 11/00* (2013.01); *B31B 50/14* (2017.08)

(58) Field of Classification Search
CPC ..... B05C 11/00; B05C 5/0208; B05C 5/0216; B26D 7/025; B26D 7/27; B26F 1/44; B26F 2001/44663; B31B 50/14; B31B 50/142
See application file for complete search history.

(56) References Cited

U.S. PATENT DOCUMENTS

2023/0020992 A1 * 1/2023 Koh ........................ B26D 7/025

FOREIGN PATENT DOCUMENTS

JP 10058389 A * 3/1998
JP 6545370 B2 * 7/2019 ................ B26F 1/44

OTHER PUBLICATIONS

Translation of JP10058389.*
Translation of JP2007021605.*
Translation of KR101934813.*

* cited by examiner

*Primary Examiner* — Sonya M Sengupta
(74) *Attorney, Agent, or Firm* — Procopio, Cory, Hargreaves & Savitch LLP

(57) ABSTRACT

The present disclosure relates to an automatic cushion-attaching device that cuts and attaches cushions or attaches cut cushions to a cutting plate along both sides of a location at which a blade portion is placed on the cutting plate. Two or more cushions to be attached are automatically attached to the cutting plate beside the blade portion depending on a (Continued)

shape of the blade portion, work of attaching cushions to the cutting plate is automatically performed by one machine, and thus effects of a significant increase in attachment speed and higher productivity are obtained.

39 Claims, 15 Drawing Sheets

(30) Foreign Application Priority Data

Nov. 14, 2019 (KR) ........................ 10-2019-0145545
Dec. 19, 2019 (KR) ........................ 10-2019-0170521
Dec. 19, 2019 (KR) ........................ 10-2019-0170526

(51) Int. Cl.
*B05C 11/00* (2006.01)
*B31B 50/14* (2017.01)

AUTOMATIC CUSHION-ATTACHING DEVICE

CROSS-REFERENCE TO RELATED APPLICATIONS

This application is a 371 application of PCT Application No. PCT/KR2020/001573, filed on Feb. 2, 2020. The PCT application claimed the benefits of priority of: Korean Patent Application No. 10-2019-0138193, filed on Oct. 31, 2019; Korean Patent Application No. 10-2019-0145541, filed on Nov. 14, 2019; Korean Patent Application No. 10-2019-0145545, filed on Nov. 14, 2019; Korean Patent Application No. 10-2019-0170521, filed on Dec. 19, 2019; and Korean Patent Application No. 10-2019-0170526, filed on Dec. 19, 2019. This application is also a continuation-in-part application of U.S. patent application Ser. No. 15/904,073. The disclosures of the above-referenced applications are incorporated herein by reference.

BACKGROUND

Field of the Disclosure

The present disclosure relates to an automatic cushion-attaching device, and more specifically, to an automatic cushion-attaching device that cuts along both side surfaces of a blade portion of a cutting plate and automatically attaches cushions or automatically attaches cut cushions, in order for the blade portion of the cutting plate to be easily separated from a planar figure after cutting the planar figure of a paper box or the like which is formed using the planar figure.

Background

A paper box made of paper is formed by drawing a planar figure on a paper board, cutting the planar figure, and folding and attaching the cut box planar figure, and clothing made of cloth is completed by performing sewing after drawing a clothing planar figure on the cloth and cutting the planar figure. Further, a product is also made using the planar figure, in some cases by drawing a planar figure on vinyl and cutting the planar figure, other than the paper or the cloth. Incidentally, in order to cut the box planar figure drawn on a paper board or the clothing planar figure drawn on cloth, a cutting plate having a blade portion attached to the cutting plate in a shape of the planar figure is used. In other words, the cutting plate having the blade portion attached to the cutting plate in a cutting line shape of the planar figure is pushed and pressed against the paper board or the cloth, and thereby the blade portion of the cutting plate cuts a planar figure of a paper box shape or a clothing shape.

As described above, after the planar figure of the paper box shape or the clothing shape is cut by the blade portion of the cutting plate, which is attached to the cutting plate, the cutting plate is lifted such that the blade portion of the cutting plate is separated from the paper board or the cloth on which the planar figure is drawn. At this time, when only the blade portion of the cutting plate is provided, the paper board or the cloth is also lifted together with the blade portion. Hence, an elastic cushion is attached to the cutting plate along a length of both side surfaces of the blade portion of the cutting plate so as to inhibit the paper board or the cloth from being lifted together with the blade portion when the blade portion of the cutting plate is separated from the paper board or the cloth. In other words, when the blade portion of the cutting plate is separated from the paper board or the cloth, the cushion presses the paper board or the cloth, thereby inhibiting the paper board or the cloth from being lifted together with the blade portion.

Incidentally, work of attaching cushions to locations of a cutting plate close to both side surfaces of a blade portion of the cutting plate is manually performed one by one in the related art as illustrated in FIG. 18. In other words, a person himself or herself continuously performs work of cutting a long cushion by appropriate lengths and then gripping and attaching the cushions to the cutting plate along both side surfaces of a part where the blade portion of the cutting plate is placed.

However, as illustrated in FIG. 19, a shape of the blade portion of the cutting plate is not simple, and thus there is a shortcoming of a significant reduction in productivity in that a lot of effort and time is required for a person himself or herself to perform work of attaching cushions to a cutting plate along both side surfaces of the blade portion of the cutting plate which has a complicated shape as described above and thus an attachment speed is remarkably decreased. In pictures of FIGS. 18 and 19, the blade portion of the cutting plate is shown between cushions illustrated in red.

SUMMARY

Technical Problem

The present disclosure is made to solve problems of the related art described above, and an object thereof is to provide an automatic cushion-attaching device that sequentially supplies, transports, and cuts cushions, transports cut cushions, applies an adhesive to a cutting plate, and attaches cut and transported cushions to the cutting plate while transporting the cutting plate by one machine at time intervals such that work of attaching the cushions to the cutting plate is automatically performed.

Technical Solution

In order to achieve the object described above, an automatic cushion-attaching device of the present disclosure is a device that cuts and attaches cushions or attaches cut cushions to a cutting plate along both sides of a location at which a blade portion is placed on the cutting plate, in which two or more cushions to be attached are automatically attached to locations of the cutting plate beside the blade portion in a shape of the blade portion.

Further, it is preferable that the cushions be attached to the cutting plate depending on angles of different cut surfaces of the cut cushions.

Further, it is preferable that the cushions which are cut into different shapes in advance be attached to the cutting plate as side surfaces of the blade portion depending on a shape of the blade portion.

Further, it is preferable that the automatic cushion-attaching device include a cushion supply unit that supplies at least one of the cushions.

Further, it is preferable that the automatic cushion-attaching device further include a cushion gripping/transporting unit that grips one of the cushions supplied by the cushion supply unit, transports the one cushion to a cutting location, and transports a cut cushion to a transport location.

Further, it is preferable that the cushion supply unit be a supply device that supplies a cushion which is to be attached to the cutting plate beside the blade portion of the cutting plate, and the cushion supply unit supply one or more cushions and transport one of the one or more supplied cushions to an appropriate location.

Further, it is preferable that the automatic cushion-attaching device further include a cushion cutting unit that cuts the cushions.

Further, it is preferable that the cushion cutting unit be a device that cuts a cushion which is to be attached to the cutting plate along both sides of the location at which the blade portion is placed on the cutting plate, and the cushion cutting unit which is lifted and lowered above the cushion cut a cushion transported to a cutting location by a certain length.

Further, it is preferable that the cushion cutting unit further include a cutting-oscillation mechanism that is connected to a center of a cutting lifting/lowering mechanism and causes a cutter to oscillate.

Further, it is preferable that the automatic cushion-attaching device further include an attachment/transport unit that transports and attaches cut cushions to the cutting plate.

Further, it is preferable that the attachment/transport unit be a device that transports cut cushions to attach the cushions to a predetermined location on the cutting plate along both sides of the location at which the blade portion is placed on the cutting plate, and the attachment/transport unit transport the cut cushions to the predetermined location of the cutting plate.

Further, it is preferable that automatic cushion-attaching device include a cushion attaching unit that is connected to the attachment/transport unit and attaches the cushions to the predetermined location of the cutting plate.

Further, it is preferable that the cushion attaching unit include an attachment lifting/lowering mechanism which is connected to a transport/attachment unit to be lifted and lowered, and the attachment lifting/lowering mechanism include an attachment cylinder unit that grips a cut cushion which is transported and an attachment/rotation unit that rotates the attachment cylinder unit.

Further, it is preferable that the automatic cushion-attaching device further include an adhesive applying unit that applies an adhesive to the cutting plate such that the cut cushions are attached to the cutting plate.

Further, it is preferable that the adhesive applying unit be a device that applies an adhesive such that cushions are attached to the cutting plate along both sides of the location at which the blade portion is provided on the cutting plate, and the adhesive applying unit apply the adhesive to a predetermined location of the cutting plate before the cushions are attached.

Further, it is preferable that the device be configured to include: a plate transporting unit on which the cutting plate is transported; a cushion supply unit that is connected to the plate transporting unit and on which one or more cushions are supplied; a cushion gripping/transporting unit that is connected to the plate transporting unit and transports a cushion which is supplied by the cushion supply unit; a cushion cutting unit that is connected to the cushion gripping/transporting unit and cuts a transported cushion; an attachment/transport unit that is provided at the plate transporting unit and is transported; a cushion attaching unit that is connected to the attachment/transport unit and attaches a cut cushion to the cutting plate; an adhesive applying unit that is provided at the cushion attaching unit; and a control unit which controls all operations of the units.

Advantageous Effects

Hence, according to the automatic cushion-attaching device, work of attaching cushions to a cutting plate is automatically performed by one machine, and thus an effect is obtained in that attachment speed is significantly increased. Further, an effect is obtained in that productivity of the cutting plate is significantly increased due to the increase in attachment speed.

Further, since cushion attaching work is automatically performed by the automatic cushion-attaching device, there is no need to employ an additional worker for cushion attachment, and thus an effect is obtained in that labor cost is significantly saved.

Further, since the cushion attaching work is performed by a precision machine such as the automatic cushion-attaching device of the present disclosure, the cushions can be attached to accurate locations at which the cushions are to be attached even when the locations have a complicated shape, and thus an effect is obtained in that an error rate is remarkably reduced.

Further, when the cushions are to be cut by an appropriate length such that the cushions are attached to a cutting plate by one machine, the cushions can be appropriately transported to a cutting location and a post-cutting location while the long cushions are automatically suppled.

Further, when multiple cushions are supplied, one cushion which needs to be supplied can be automatically supplied.

Further, one side of the cushions can be gripped and accurately transported to a cushion cutting location, and the cushions can be accurately transported to a transport location from which cut cushions is transported to be attached to the cutting plate after cutting.

Further, multiple cushions having a certain length are not cut one by one by a worker but are automatically cut in order for the cushions to be attached to the cutting plate, and thus an effect is obtained in that cutting work is rapidly and highly efficiently performed.

Further, cut surfaces of the cut cushions can have various angles depending on locations of attachment, and a rotating cushion cutting device can cut the cushions at any angle to have a cut surface which is wanted.

Further, an oscillation function is added to the cutter which cuts the cushions, and thus an effect is obtained in that cutting work is more smoothly performed.

Hence, work of transporting and attaching cushions to the cutting plate is automatically performed by a transport/attachment unit and the cushion attaching unit, and thus an effect is obtained in that attachment speed is significantly increased. Further, an effect is obtained in that productivity of the cutting plate is significantly increased due to the increase in attachment speed.

Further, since cushion attaching work is automatically performed by the cushion attaching unit as one unit in a configuration of the present disclosure, there is no need to employ an additional worker for cushion attachment, and thus an effect is obtained in that labor cost is significantly saved.

Further, since the cushion attaching work is performed by a precision machine such as a cushion transporting/attaching device of the present disclosure, the cushions can be attached to accurate locations at which the cushions are to be attached even when the locations have a complicated shape, and thus an effect is obtained in that an error rate can be remarkably reduced.

Further, an adhesive which is used to attach the cushions to the cutting plate is automatically applied before attachment of the cushions, and thus an effect is obtained in that the adhesive can be highly efficiently applied.

Further, an effect is obtained in that work of applying an adhesive to the cutting plate is accurately and rapidly performed by using an air cylinder which is used as an adhesive supply mechanism.

DETAILED DESCRIPTION

Figure 1:
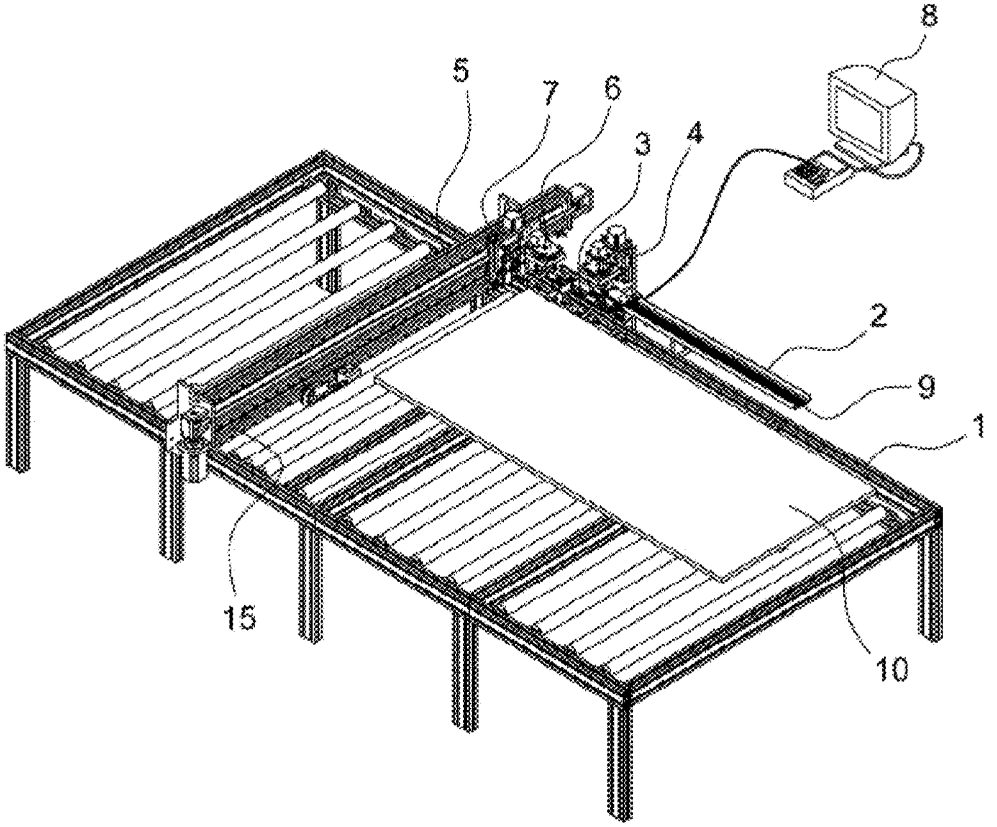
FIG. 1 is an overall perspective view illustrating an automatic cushion-attaching device according to the present disclosure.
Figure 2:
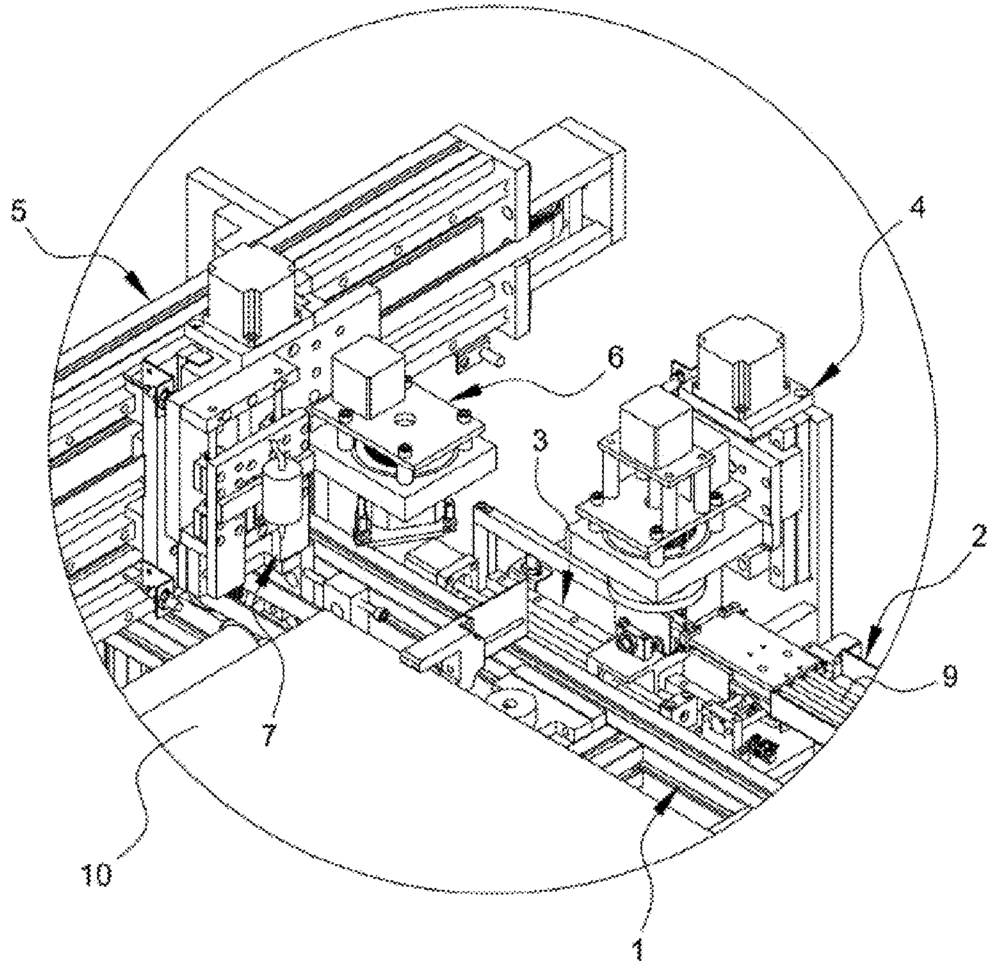
FIG. 2 is a partial perspective view illustrating the automatic cushion-attaching device according to the present disclosure.

FIG. 1 is an overall perspective view illustrating an automatic cushion-attaching device according to the present disclosure, and FIG. 2 is a partial perspective view illustrating the automatic cushion-attaching device according to the present disclosure.

As illustrated in FIGS. 1 and 2, the automatic cushion-attaching device according to the present disclosure is configured to include a plate transporting unit 1, a cushion supply unit 2, a cushion gripping/transporting unit 3, a cushion cutting unit 4, an attachment/transport unit 5, a cushion attaching unit 6, an adhesive applying unit 7, and a control unit 8. The units continuously perform operations of cutting a long cushion 9 by an appropriate length while supplying and transporting the cushion 9, and then automatically attaching the cut cushion 9 to a cutting plate 10 along both side surfaces of a blade portion of the cutting plate which is to be placed on the cutting plate 10.

In this respect, detailed structures of and operational relationships between the units are to be described.

Figure 3:
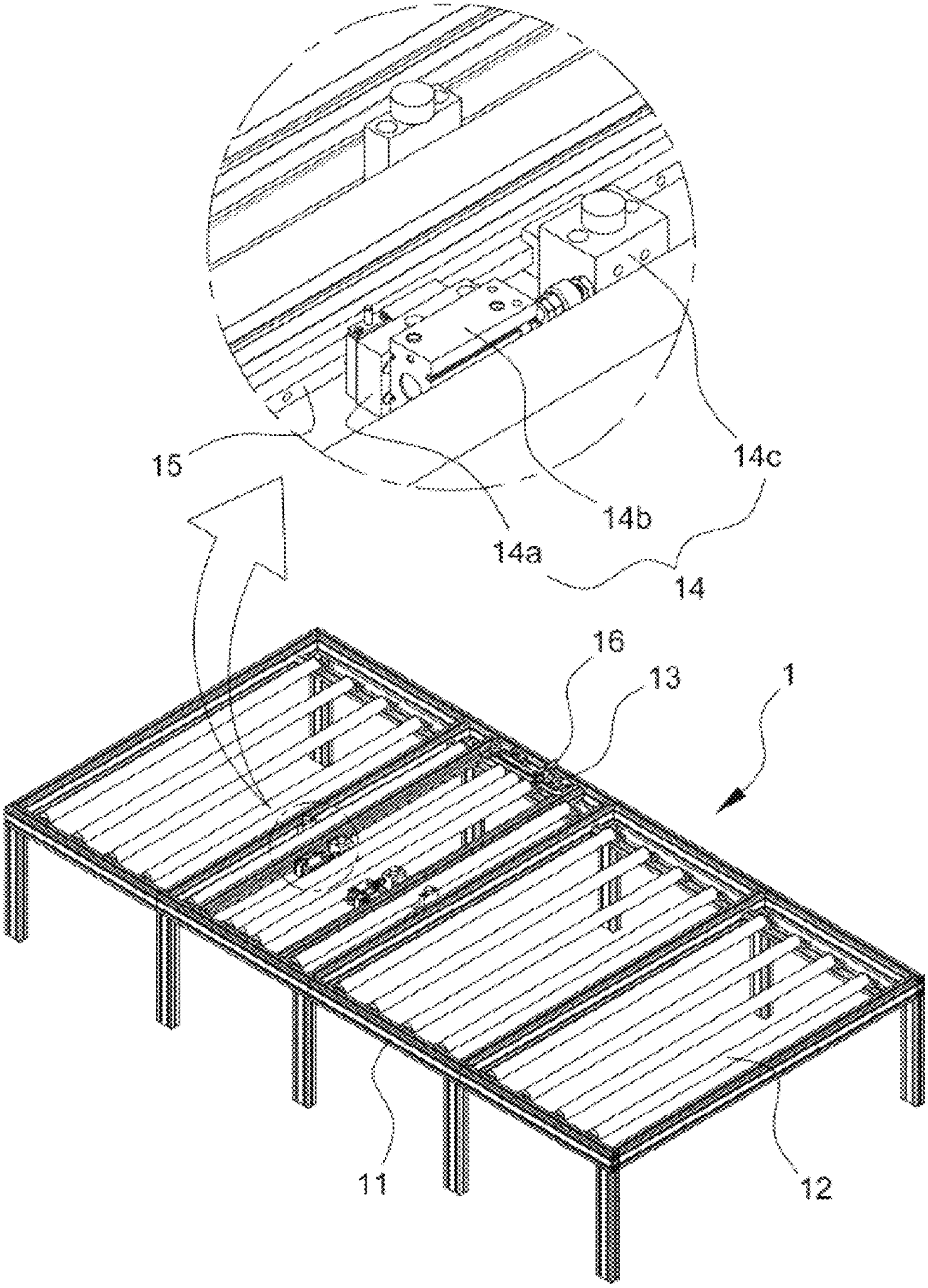
FIG. 3 illustrates a perspective view of a plate transporting unit and an enlarged view of main parts of the plate transporting unit of the automatic cushion-attaching device according to the present disclosure.

FIG. 3 illustrates a perspective view of a plate transporting unit and an enlarged view of main parts of the plate transporting unit of the automatic cushion-attaching device according to the present disclosure.

As illustrated in FIG. 3, the plate transporting unit 1 is configured to include a table frame 11 having legs and roller bars 12. The roller bars 12 are arranged on the table frame 11 in a width direction thereof such that the cutting plate 10 is transported on a top plane in a longitudinal direction of the table frame, and multiple roller bars 12 are arranged one after another at regular intervals in the longitudinal direction of the table frame 11. Incidentally, for the roller bars arranged at the top plane of the table frame 11 with the cushion gripping/transporting unit 3, the cushion cutting unit 4, the attachment/transport unit 5, and the like are positioned at about a middle part thereof, it is preferable that the roller bars 12 are arranged without an interval except for a part thereof.

Rotational close-contact mechanisms 13 are arranged at regular intervals along one side surface of the cutting plate 10 between the roller bars 12 at about the middle part of the table frame 11, the rotational close-contact mechanisms being configured of multiple rotary rollers which are rotated by a motor such that the one side surface of the cutting plate 10 comes into close contact with one side surface of the table frame. Further, a plurality of transport/close-contact mechanisms 14 are arranged at intervals between the roller bars 12 in a middle part of the table frame 11 at another side thereof. Further, the transport/close-contact mechanisms 14 are connected to a close-contact transporting mechanism 15 which is provided in a rail shape in the width direction at about the middle part of the table frame 11, and the close-contact transporting mechanism 15 causes the transport/close-contact mechanisms 14 to perform horizontally reciprocating sliding in a width direction of the plate transporting unit 1 between the roller bars 12. The transport/close-contact mechanisms 14 is configured of a pneumatic or hydraulic cylinder 14*b* to which a rail lock 14*a* is connected, and a piston of the pneumatic or hydraulic cylinder 14*b* comes into close contact with the other side of the cutting plate 10. Further, the transport/close-contact mechanisms 14 are individually arranged between the roller bars 12 in a state of having regular intervals. Two transport/close-contact mechanisms 14 are connected to each other through a lower end portion thereof, and a transport/close-contact mechanism 14 at one side is connected to the close-contact transporting mechanism 15. In this manner, the two transport/close-contact mechanisms 14 are both moved in the width direction of the cutting plate 10 by the close-contact transporting mechanism 15.

As described above, one side of the cutting plate 10 comes into close contact with the rotational close-contact mechanisms 13. Regarding the other side of the cutting plate 10, the transport/close-contact mechanisms 14 comes into close contact with the other side of the cutting plate 10, while being horizontally moved to come into close contact therewith by the close-contact transporting mechanism 15 (refer to FIG. 1) to which the transport/close-contact mechanisms 14 are connected. Here, the transport/close-contact mechanisms 14 are each configured to include the rail lock 14*a*, the pneumatic or hydraulic cylinder 14*b*, and a block rotating roller 14*c*. In this respect, the transport/close-contact mechanisms 14 are moved to be close to the other side of the cutting plate 10 and then is locked by the rail lock 14*a* such that the transport/close-contact mechanisms do not move any more. Then, the pneumatic or hydraulic cylinder 14*b* is operated such that the piston of the pneumatic or hydraulic cylinder 14*b* pushes the block rotating roller 14*c* such that an idle-type rotary roller provided at the block rotating roller 14*c* is in contact with the other side of the cutting plate 10 all the time. Consequently, the one side of the cutting plate 10 is in close contact with the rotary roller which configures the rotational close-contact mechanisms 13, and the other side of the cutting plate 10 is in close contact with the rotary roller of the block rotating roller 14*c* due to piston movement of the pneumatic or hydraulic cylinder 14*b*, so the cutting plate 10 is stably transported by the rotary rollers of the rotational close-contact mechanisms 13 and transport/close-contact mechanisms 14. In this manner, even when the cutting plate 10 is slightly moved in the width direction thereof, the cutting plate 10 is slightly pushed to be adjusted to the slight movement in the width direction by the piston of the pneumatic or hydraulic cylinder 14*b* or by the rotary roller of the block rotating roller 14*c* which is pushed by the piston, and thus the cutting plate is stably transported while being adjusted accurately to movement of the cutting plate 10 in the width direction.

On the other hand, an entry sensor 16 that recognizes and notifies entry of the cutting plate 10 is provided at one side surface of the table frame 11 at about a middle part thereof, and thereby detection of the entry sensor 16 causes work of attaching the cushion 9 to the cutting plate 10 to start.

With reference to FIGS. 1 and 2, in the automatic cushion-attaching device configured to include the plate transporting unit 1, the cushion supply unit 2, the cushion gripping/transporting unit 3, the cushion cutting unit 4, the attachment/transport unit 5, the cushion attaching unit 6, the adhesive applying unit 7, and the control unit 8, the cushion supply unit 2 and the cushion gripping/transporting unit 3 which correspond to a cushion supply device supply and transport the long cushion 9 to a cutting location which is an appropriate location, and operations of cutting the cushion by an appropriate length at the cutting location and then transporting the cushion to a post-cutting location are continuously performed.

In this respect, detailed structures of and an operational relationship between the cushion supply unit 2 and the cushion gripping/transporting unit 3 which configure the cushion supply device in the automatic cushion-attaching device according to the present disclosure are to be described.

Figure 4:
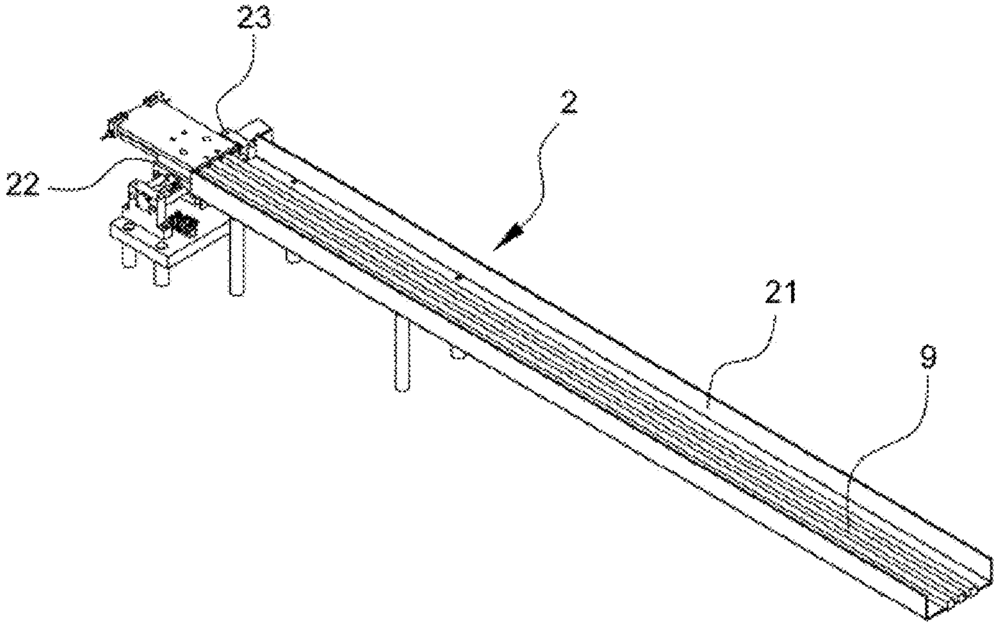
FIG. 4 is a perspective view illustrating a cushion supply unit which configures a cushion supply device in the automatic cushion-attaching device according to the present disclosure.
Figure 5:
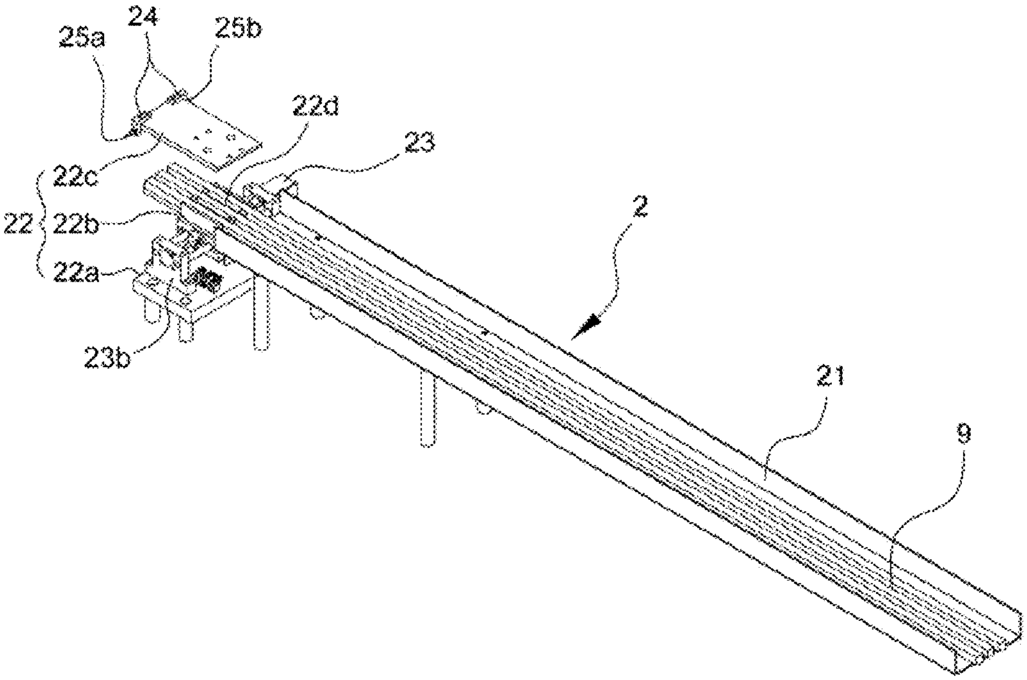
FIG. 5 is a partially exploded perspective view illustrating the cushion supply unit which configures the cushion supply device in the automatic cushion-attaching device according to the present disclosure.
Figure 6:
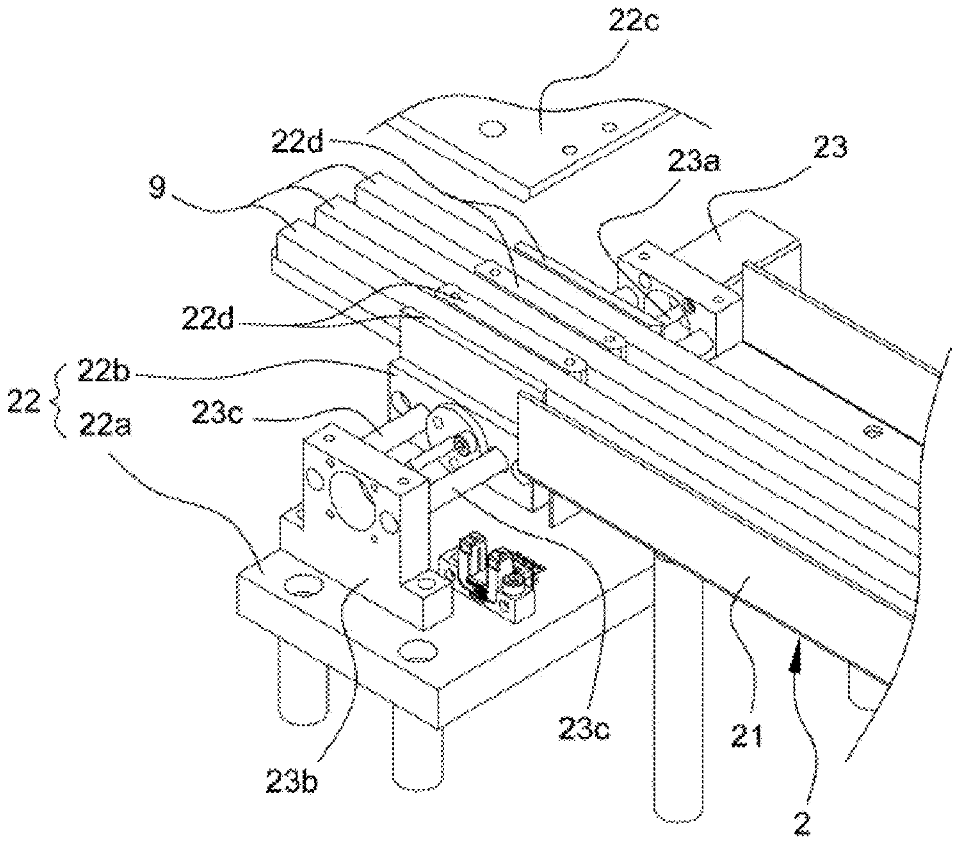
FIG. 6 is a partially enlarged perspective view illustrating the cushion supply unit which configures the cushion supply device in the automatic cushion-attaching device according to the present disclosure.

FIG. 4 is a perspective view illustrating the cushion supply unit which configures the cushion supply device in the automatic cushion-attaching device according to the present disclosure, FIG. 5 is a partially exploded perspective view illustrating the cushion supply unit which configures the cushion supply device in the automatic cushion-attaching device according to the present disclosure, and FIG. 6 is a partially enlarged perspective view illustrating the cushion supply unit which configures the cushion supply device in the automatic cushion-attaching device according to the present disclosure.

As illustrated in FIGS. 4 to 6, the cushion supply unit 2 which configures the cushion supply device in the automatic cushion-attaching device according to the present disclosure is connected to a side surface of the table frame 11 at one side thereof in FIG. 1 and is configured to include a long supply rail 21 and a selective supply unit 22 which comes into close contact with a front surface of the supply rail 21 and is provided to separately face the cushion gripping/transporting unit 3. One or more, and preferably, three long cushions 9 are supplied in a row at slight intervals in a longitudinal direction of the supply rail inside the supply rail 21. Further, the selective supply unit 22 can move horizontally in a width direction thereof at one end of the supply rail 21 by a selection/transport unit 23 provided at one side.

The selective supply unit 22 is configured to include a selection table 22*a* connected to a side surface of the table frame 11, a selection guide portion 22*b*, and a selection cover 22*c*, and the selection/transport unit 23 is connected to one side surface of the selection guide portion 22*b* positioned on the selection table 22*a*. Guide grooves are formed between guide bars 22*d* arranged at intervals above the selection guide portion 22*b* such that the three cushions 9 are inserted into the guide grooves, respectively. Here, one side of the selection guide portion 22*b* in a width direction thereof, at which one side of the cushions 9 is placed, extends to be long in the width direction thereof such that one side of the cushions 9 on the selection guide portion 22*b* is located to be also long outward in the width direction of the selection table 22*a*. Further, the selection/transport unit 23 has a transport shaft 23*a* which penetrates a central portion of a lower part of the selection guide portion 22*b* to be connected to a support bracket 23*b* fixed to the selection table 22*a* at the opposite side, and guide pins 23*c* connected to the selection/transport unit 23 at both sides of the transport shaft 23*a*, respectively, penetrate both sides of the lower part of the selection guide portion 22*b* to be connected to the support bracket 23*b*.

As described above, when the selection guide portion 22*b* is moved horizontally in the width direction at the one side of the supply rail 21 due to connection to the selection/transport unit 23, any one cushion 9 of the multiple cushions supplied to the supply rail 21 is selected to face the cushion gripping/transporting unit 3 while the cushions 9 inserted into the respective guide grooves are horizontally moved together with the selection guide portion.

A step motor or a servomotor, for example, is used as the selection/transport unit 23, and the transport shaft 23*a* functions as a motor shaft when the step motor or the servomotor is used.

Further, sensor brackets 24 are provided at both sides of one end of the selection cover 22, respectively, and limit sensors 25 are provided to be connected to the sensor brackets 24, respectively, the limit sensors facing both sides of the extending selection guide portion 22*b* of the selective supply unit 22. Consequently, the limit sensors 25 limit a movement range of the selection guide portion 22*b* such that the selection guide portion 22*b* moves only within a certain distance when moving in the width direction at one end of the supply rail 21.

On the other hand, the cushions 9 can be supplied by an automatic cartridge unit to be automatically supplied when the cushions 9 are supplied to the cushion supply unit 2.

Figure 7:
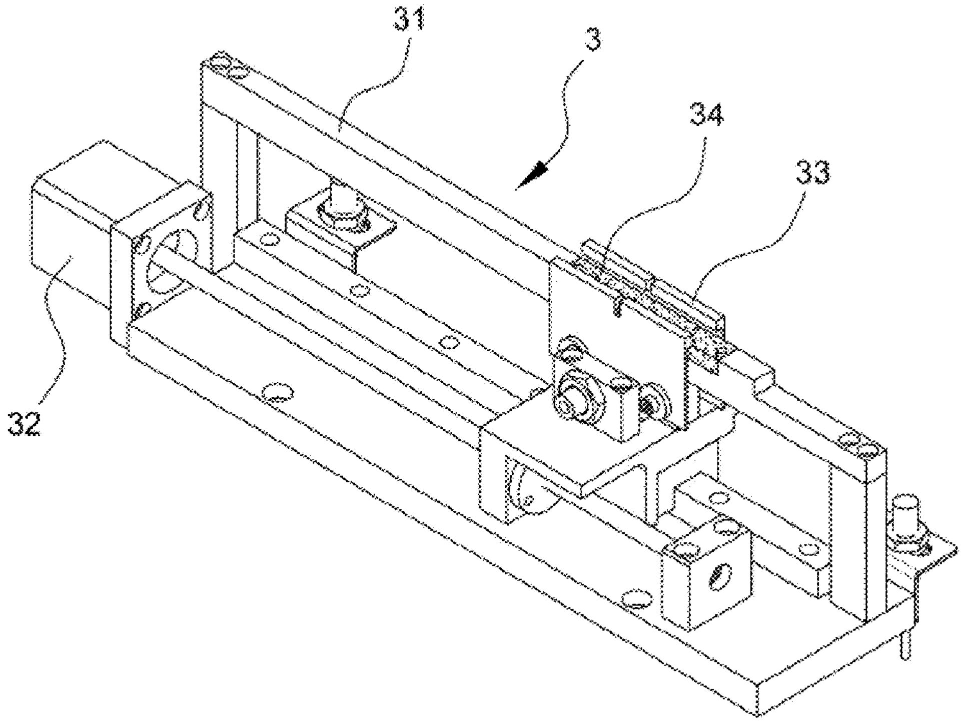
FIG. 7 is a perspective view illustrating a cushion gripping/transporting unit which configures the cushion supply device in the automatic cushion-attaching device according to the present disclosure.
Figure 8:
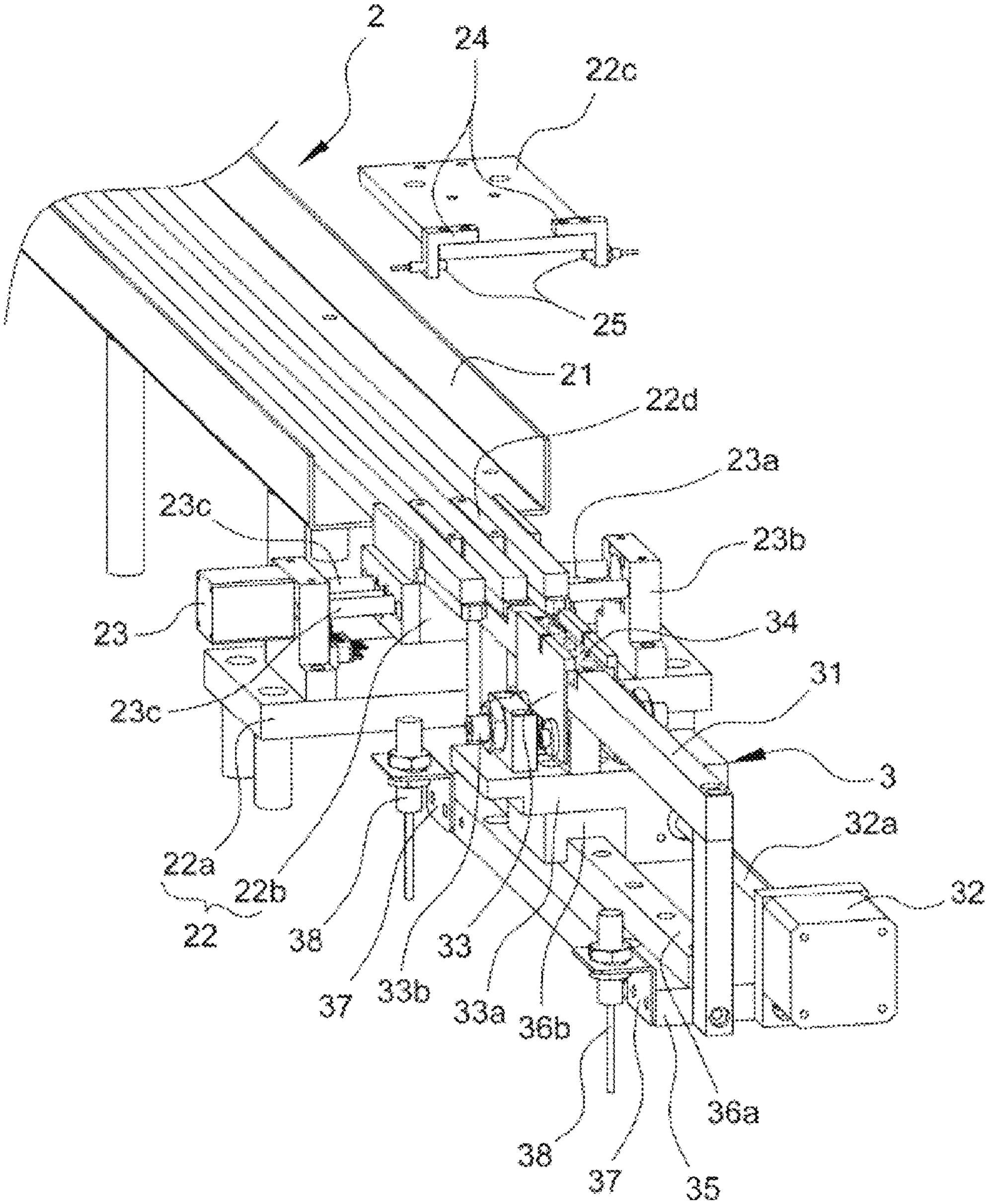
FIG. 8 is a perspective view illustrating a state where a middle cushion is supplied to the cushion supply device in the automatic cushion-attaching device according to the present disclosure.

FIG. 7 is a perspective view illustrating the cushion gripping/transporting unit of the automatic cushion-attaching device according to the present disclosure, and FIG. 8 is a detail view illustrating a state where a cushion is gripped by a grip clamp of the cushion gripping/transporting unit of the automatic cushion-attaching device according to the present disclosure.

As illustrated in FIGS. 7 and 8, the cushion gripping/transporting unit 3 is configured to include a grip rail 31, a grip motor 32, and a grip clamp 33 and is connected to one side surface of the table frame 11, and the grip clamp 33 connected to the grip motor 32 is opened and closed while the grip clamp performs horizontally reciprocating sliding on the grip rail 31 based on an operation of the grip motor 32. A step motor or a servomotor, for example, is used as the grip motor 32. Consequently, the grip clamp 33 enters a location below the selective supply unit 22 of the cushion supply unit 2 which the grip clamp faces while moving forward in a horizontal direction toward one end on the grip rail 31, and the grip clamp grips an end of the cushion 9 and moves rearward horizontally to a cutting location 34 on the grip rail 31. Then, the cushion cutting unit 4 cuts the cushion 9 by an appropriate length at the cutting location 34, and the grip clamp 33 grips the cut cushion 9 and moves further rearward in the horizontal direction toward the other end on the grip rail 31. Meanwhile, it is preferable that the cutting location 34 be made of a soft plastic material so as not to be damaged when a cutter 44 of the cushion cutting unit 4 reaches the cutting location.

FIG. 7 is a perspective view illustrating the cushion gripping/transporting unit which configures the cushion supply device in the automatic cushion-attaching device according to the present disclosure.

As illustrated in FIG. 7, the cushion gripping/transporting unit 3 is configured to include the grip rail 31 provided on a grip table 35, the grip motor 32, and the grip clamp 33 and is connected to the one side surface of the table frame 11, and the grip clamp 33 connected to a motor shaft 32*a* of the grip motor 32 is opened and closed while the grip clamp performs horizontally reciprocating sliding on the grip rail 31 based on the operation of the grip motor 32. A step motor or a servomotor, for example, is used as the grip motor 32. The grip clamp 33 is provided on a clamp support 33*a* connected to the motor shaft 32*a* of the grip motor 32 and wraps the grip rail 31. Further, a pneumatic or hydraulic cylinder 33*b* is connected to one side surface of the grip clamp 33 such that the grip clamp 33 performs a clamp operation of opening and closing due to an operation of the pneumatic or hydraulic cylinder 33*b*. Further, an LM guide 36*a* is provided on the grip table 35 along the grip rail 31, and an LM block 36*b* which is coupled to the LM guide 36*a* and guides movement of the clamp support 33*a* along the LM guide 36*a* is integrally formed under the clamp support 33*a*.

Meanwhile, sensor brackets 37 are also provided at both sides of one end of the grip table 35, respectively, and limit sensors 38 are provided to be connected to the sensor brackets 37, respectively, the limit sensors limiting a movement distance of the clamp support 33*a* which moves along the LM guide 36*a*. Consequently, the limit sensors 38 limit a movement range of the grip clamp 33 such that the grip clamp 33 provided on the clamp support 33*a* moves only within a certain distance when moving on the grip rail 31

Figure 9:
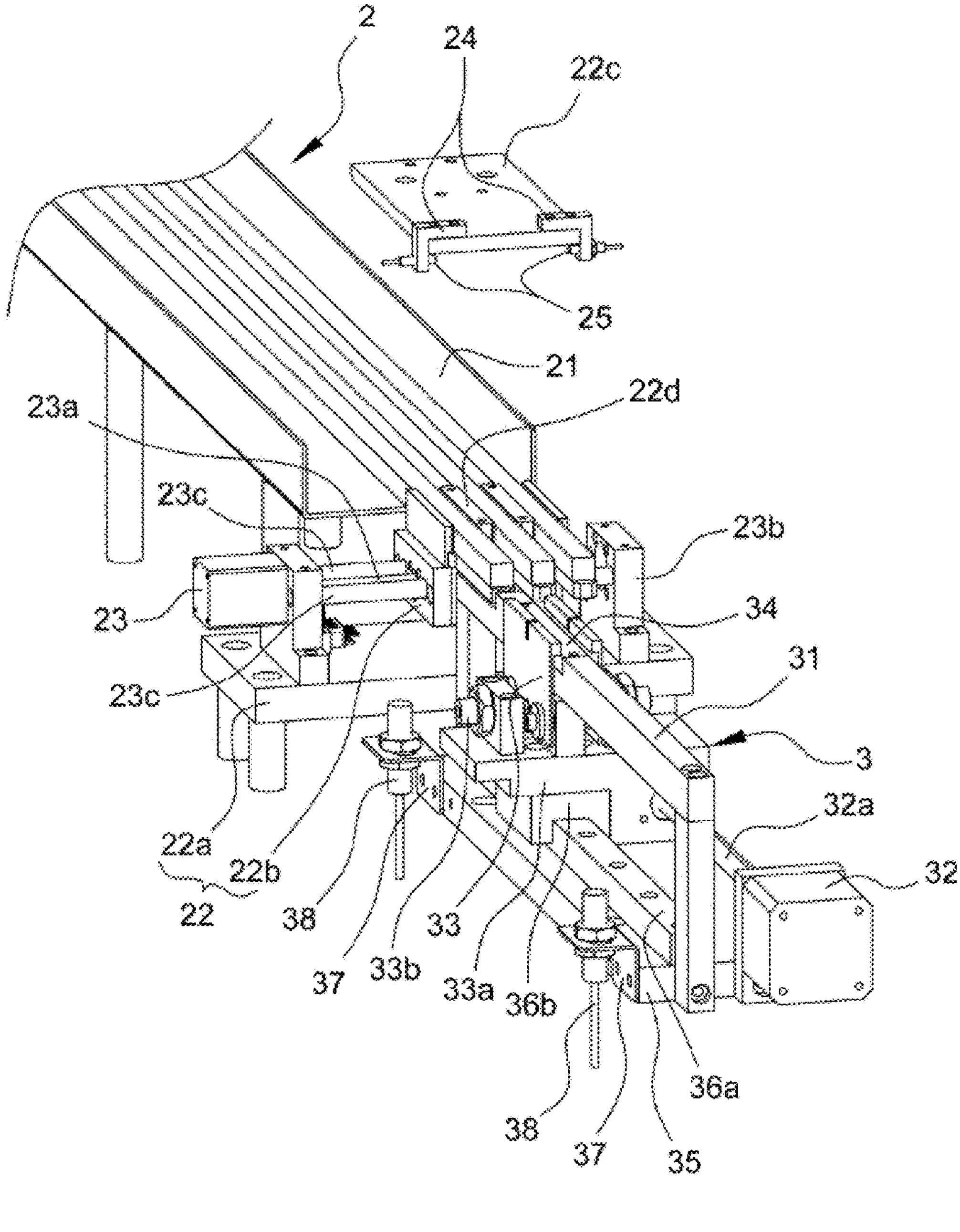
FIG. 9 is a perspective view illustrating a state where one cushion of cushions at both sides of the middle is supplied to the cushion supply device in the automatic cushion-attaching device according to the present disclosure.
Figure 10:
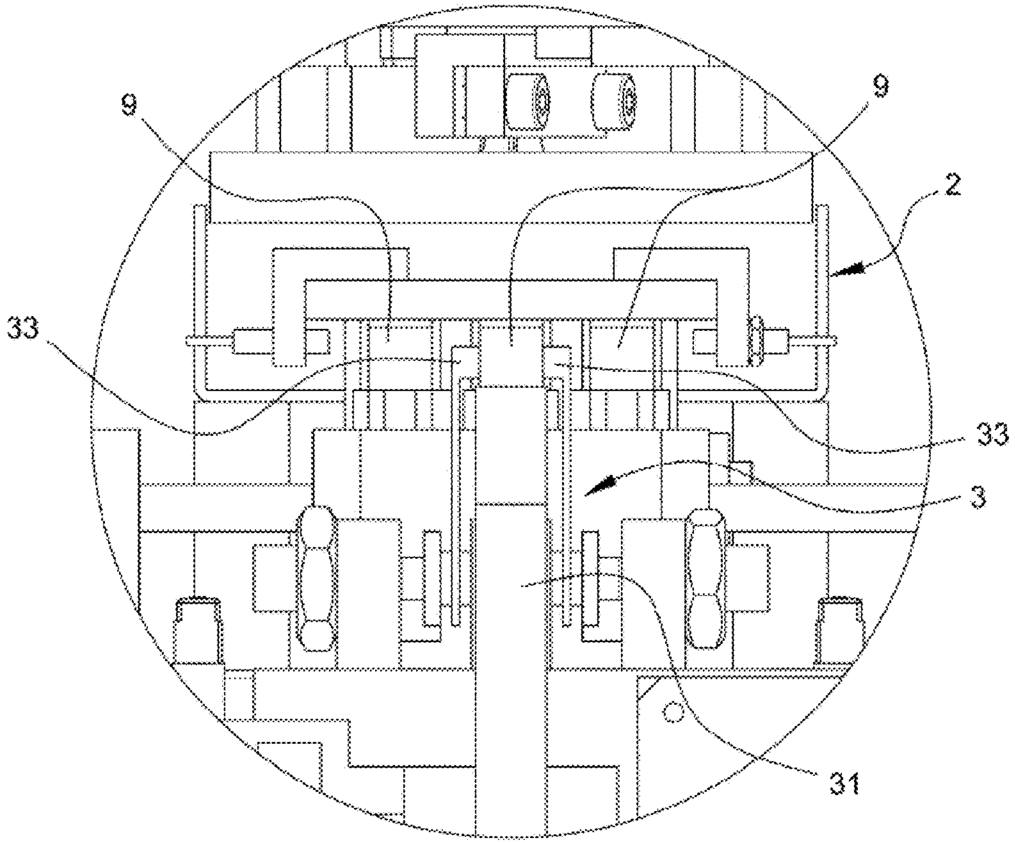
FIG. 10 is a detail view illustrating a state where a cushion is gripped by a grip clamp of a cushion gripping/transporting unit of the automatic cushion-attaching device according to the present disclosure.

FIG. 8 is a perspective view illustrating a state where a middle cushion is supplied to the cushion supply device in the automatic cushion-attaching device according to the present disclosure, FIG. 9 is a perspective view illustrating a state where one cushion of cushions at both sides of the middle is supplied to the cushion supply device in the automatic cushion-attaching device according to the present disclosure, and FIG. 10 is a detail view illustrating a state where a cushion is gripped by the grip clamp of the cushion gripping/transporting unit of the automatic cushion-attaching device according to the present disclosure. A series of processes of transporting a cut cushion after supplying and cutting the cushion is described step by step with reference to the FIGS. 8 to 10.

First, while the selection guide portion 22*b* is moved in the width direction of the supply rail 21 of the cushion supply unit 2 due to an operation of the selection/transport unit 23 of the selective supply unit 22, any one cushion 9 of the multiple cushions 9 placed on the supply rail 21 is caused to face the grip rail 31 of the cushion gripping/transporting unit 3.

Next, the grip clamp 33 of the cushion gripping/transporting unit 3 enters a location below the extending selection guide portion 22*b* of the selective supply unit 22 of the cushion supply unit 2 which the grip rail 31 faces, while the grip clamp moves forward in the horizontal direction toward one end on the grip rail 31 due to an operation of the grip motor 32.

Next, the grip clamp 33, which entered the location, grips an end of the cushion 9 placed on the extending selection guide portion 22*b* and transports the cushion rearward horizontally to the cutting location 34 on the grip rail 31 due to the operation of the grip motor 32.

Next, the cushion cutting unit 4 cuts the cushion 9 by an appropriate length at the cutting location 34, and the grip clamp 33 grips the cut cushion 9 and transports the cushion further rearward in the horizontal direction toward the other end on the grip rail 31 due to the operation of the grip motor 32. Meanwhile, it is preferable that the cutting location 34 be made of a soft plastic material so as not to be damaged when the cutter 44 of the cushion cutting unit 4 reaches the cutting location.

Operations of the units described above are controlled by the control unit 8 configured of a control panel, a monitor, and the like illustrated in FIG. 1.

With reference to FIGS. 1 and 2, in the automatic cushion-attaching device configured to include the plate transporting unit 1, the cushion supply unit 2, the cushion gripping/transporting unit 3, the cushion cutting unit 4, the attachment/transport unit 5, the cushion attaching unit 6, the adhesive applying unit 7, and the control unit 8, when the cushion supply unit 2 and the cushion gripping/transporting unit 3 supply and transport the long cushion 9 to a cutting location which is an appropriate location, a cutting lifting/lowering mechanism 41, a cutting-rotation mechanism 42, and a cutting-oscillation mechanism 43 which configure the cushion cutting unit 4 corresponding to a cushion cutting device continuously cuts the cushion by appropriate lengths at the cutting location.

In this respect, detailed structures of and operational relationships between the cutting lifting/lowering mechanism 41, the cutting-rotation mechanism 42, and the cutting-oscillation mechanism 43 as mechanisms of the cushion cutting unit 4 corresponding to the cushion cutting device in the automatic cushion-attaching device according to the present disclosure are to be described.

Figure 11:
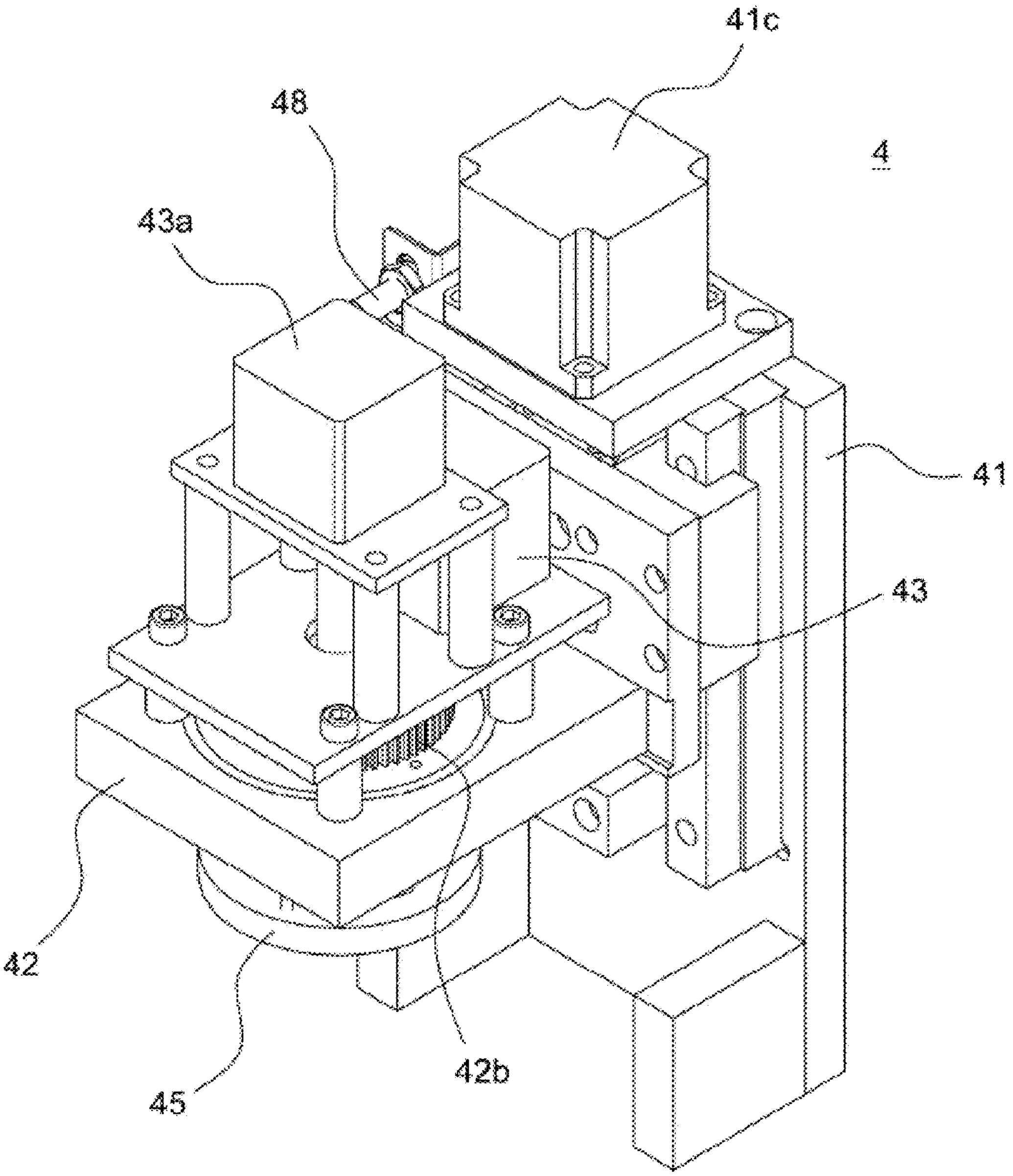
FIG. 11 is a perspective view illustrating a cushion cutting unit which configures a cushion cutting device in the automatic cushion-attaching device according to the present disclosure.
Figure 12:
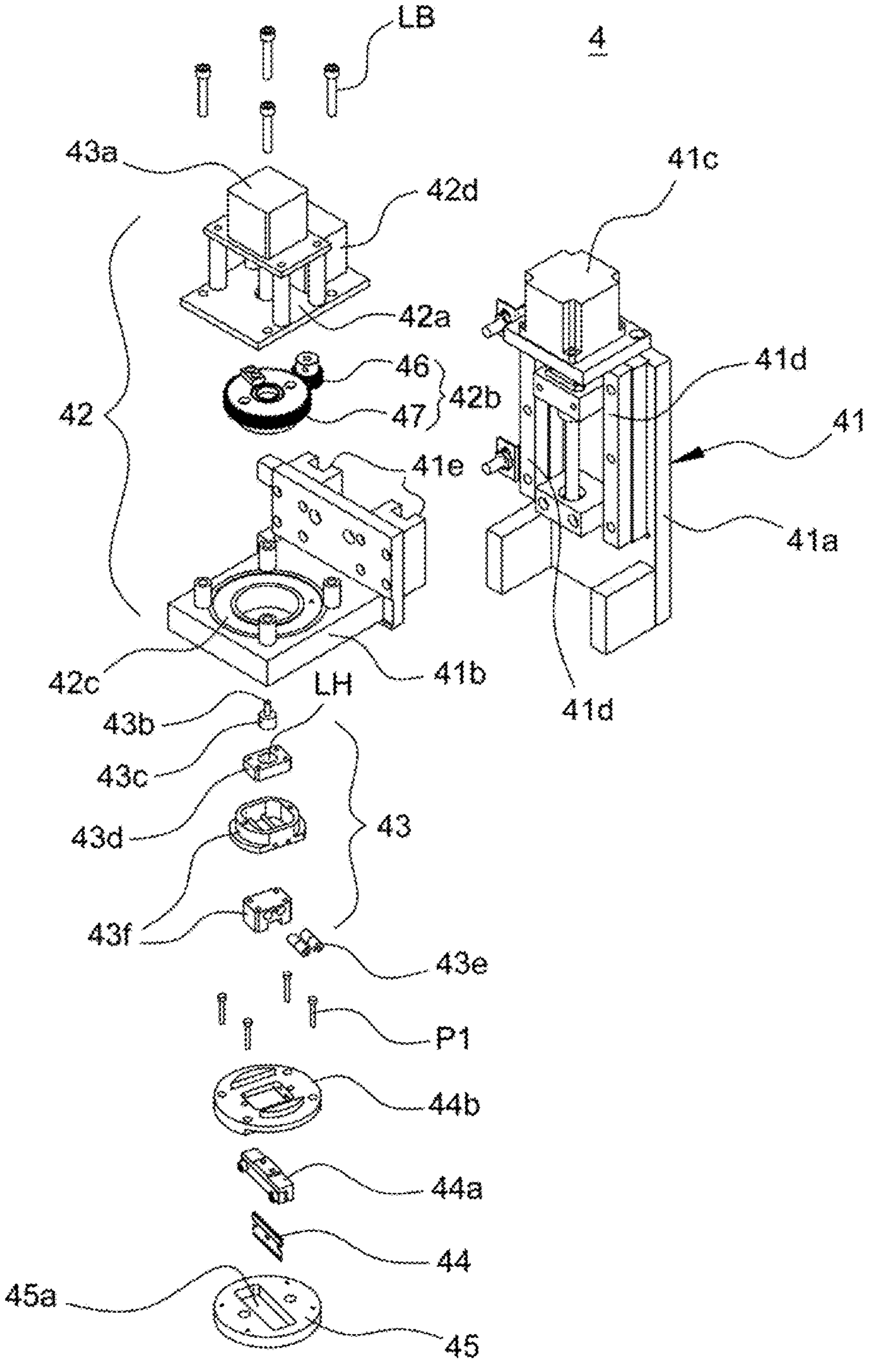
FIG. 12 is an exploded perspective view illustrating the cushion cutting unit which configures the cushion cutting device in the automatic cushion-attaching device according to the present disclosure.
Figure 13:
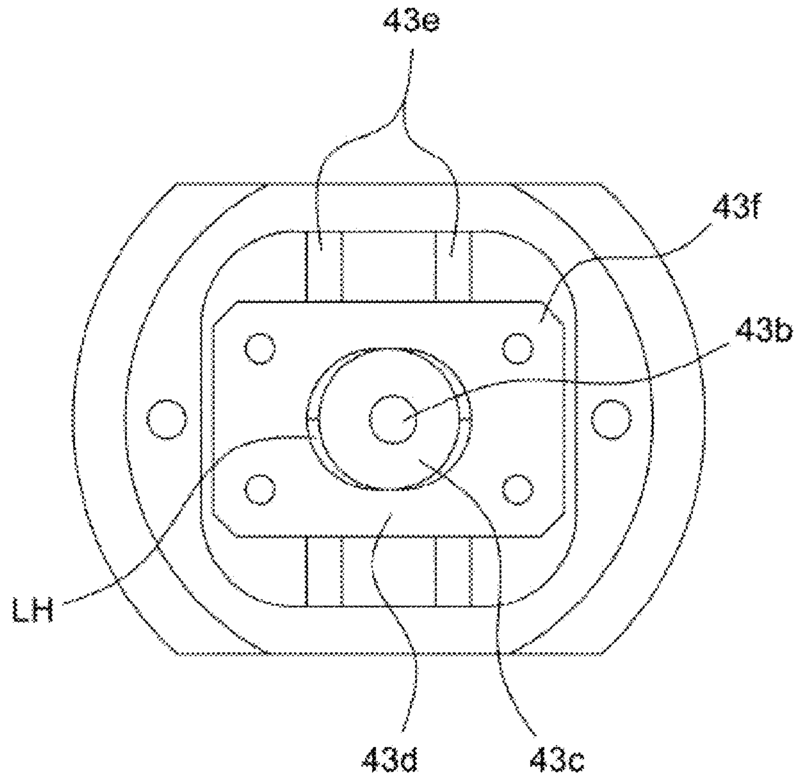
FIG. 13 is a top view illustrating a cutting-oscillating mechanism which is included in the cushion cutting unit in the automatic cushion-attaching device according to the present disclosure.

FIG. 11 is a perspective view illustrating the cushion cutting unit which configures the cushion cutting device in the automatic cushion-attaching device according to the present disclosure, FIG. 12 is an exploded perspective view illustrating the cushion cutting unit which configures the cushion cutting device in the automatic cushion-attaching device according to the present disclosure, and FIG. 13 is a top view illustrating a cutting oscillating mechanism which is included in the cushion cutting unit in the automatic cushion-attaching device according to the present disclosure.

As illustrated in FIGS. 11 to 13, the cushion cutting unit 4 corresponding to the cushion cutting device is configured to include the cutting lifting/lowering mechanism 41, the cutting-rotation mechanism 42, and the cutting-oscillation mechanism 43 in the automatic cushion-attaching device according to the present disclosure, and the cutting lifting/lowering mechanism 41 is provided to face the table frame 11 above the cushion gripping/transporting unit 3 while the cutting lifting/lowering mechanism is connected to the one side surface of the table frame 11 in FIG. 1.

The cutting lifting/lowering mechanism 41 is configured to include a cutting body 41*a* and a lifting/lowering body 41*b*, and a cutting lifting/lowering motor 41*c* is provided at a central portion of the cutting body 41*a*. Further, LM guides 41*d* are provided at both sides of the cutting body 41*a*, respectively, and LM blocks 41*e* coupled to the LM guides 41*d* not to be decoupled therefrom are provided at both sides of a rear surface of the lifting/lowering body 41*b*. A step motor or a servomotor, for example, is used as the cutting lifting/lowering motor 41*c*. Consequently, the lifting/lowering body 41*b* is connected to a motor shaft of the cutting lifting/lowering motor 41*c* in a nut-coupling manner, and the lifting/lowering body 41*b* is vertically lifted and lowered while the LM blocks 41*e* slide upward and downward along the LM guides 41*d*. The cutter 44 is provided together with other configurational units below the lifting/lowering body 41*b* of the cutting lifting/lowering mechanism 41. A cutting blade such as a common knife is used as the cutter 44.

The cutting-rotation mechanism 42 is configured to include a motor mounting portion 42*a*, a gear assembly 42*b*, and a cutting-rotation bearing 42*c*, and the motor mounting portion 42*a* is coupled to the lifting/lowering body 41*b* with a wrench bolt LB on a front surface of the lifting/lowering body 41*b* of the cutting lifting/lowering mechanism 41 in a state where a cutting-rotation motor 42*d* is mounted at one side of the motor mounting portion 42*a*. A step motor or a servomotor, for example, is used as the cutting-rotation motor 42*d*. The cutting-rotation bearing 42*c* is provided at a central portion of the front surface of the lifting/lowering body 41*b*, and the gear assembly 42*b* connected to a motor shaft of the cutting-rotation motor 42*d* is coupled to the cutting-rotation bearing 42*c*. Consequently, when the cutting-rotation motor 42*d* rotates, the cutting-rotation motor rotates the cutter 44 connected to a lower side of the lifting/lowering body 41*b* through the gear assembly 42*b* and the cutting-rotation bearing 42*c*. In other words, the cutter 44 is connected to the lifting/lowering body 41*b* which is vertically lifted and lowered and is connected together with other members to a central portion of the cutting-rotation bearing 42*c* which rotates, thus also rotating while being vertically lifted and lowered in an up-down direction. The gear assembly 42*b* is configured to include a small transmission gear 46 connected to the motor shaft of the cutting-rotation motor 42*d* and a large rotation gear 47 meshed with the small transmission gear 46, and the large rotation gear 47 is coupled to the cutting-rotation bearing 42*c*.

The cutting-oscillation unit 43 is configured to include an oscillation motor 43*a* mounted on the motor mounting portion 42*a*, an eccentric shaft 43*b* connected to a motor shaft of the oscillation motor 43*a*, an eccentric-oscillation bearing 43*c* which is inserted into and coupled to a central portion of the large rotation gear 47 to be connected to the eccentric shaft 43*b*, an eccentric plate 43*d* having a long hole LH formed at a central portion thereof, and an oscillation body 43*f* in which a rectilinear bearing 43*e* which performs horizontally reciprocating sliding is provided at both sides on a top surface of the oscillation body. A step motor or a servomotor, for example, is used as the oscillation motor 43*a*. In this respect, the eccentric shaft 43*b* of the oscillation motor 43*a* penetrates the rotation bearing 42*c* at a central portion thereof and is inserted into the long hole LH of the eccentric plate 43*d* disposed at a lower side of the rotation bearing 42*c*, and the eccentric plate 43*d* is coupled to the oscillation body 43*f*. Consequently, when the eccentric shaft 43*b* eccentrically rotates in the long hole LH, the eccentric plate 43*d* performs horizontally reciprocating sliding, and the oscillation body 43*f* connected to the eccentric plate 43*d* with the rectilinear bearing 43*e* also performs horizontally rectilinear reciprocating sliding. In this manner, the cutter 44 connected to the oscillation body 43*f* also performs horizontally rectilinear oscillation movement while performing reciprocating sliding. Here, the cutter 44 is provided at a blade fixing portion 44*a* such that the blade fixing portion 44*a* is connected to a central portion of a connection body 44*b* coupled to the oscillation body 43*f*. Here, the eccentric shaft 43*b* is connected to a motor shaft of the oscillation motor 43*a*, and the eccentric-oscillation bearing 43*c* is connected to a lower portion of the eccentric shaft 43*b*. In this manner, the eccentric shaft 43*b* is connected to a location of the eccentric-oscillation bearing 43*c*, the location being separated slightly, for example, by 1 to 2 mm from a center of the eccentric-oscillation bearing.

Further, a fixing plate 45, which has a blade passing hole 45*a* formed at a central portion and through which the cutter 44 passes, is connected to the connection body 44*b* with connection pins P1 connected to a lower portion of the connection body 44*b*. The fixing plate 45 is connected above the connection pins P1 inserted into and fixed to the connection body 44*b*, with a slight gap interposed therebetween such that the fixing plate can slightly move upward and downward. The fixing plate 45 is connected to slightly move upward and downward, and thereby, the fixing plate 45 is slightly lifted to support the cushion 9 while pressing the cushion 9 when the cushion 9 is cut by the cutter 44. In this manner, the cushion is pressed and fixed not to move, and the cutter 44 can stably cut the cushion 9 adequately by an appropriate depth.

The cutter 44 connected to the cutting lifting/lowering mechanism 41 of the cushion cutting unit 4 as described above is lowered to cut the cushion 9 transported to the cutting location by the cushion gripping/transporting unit 3 by an appropriate length, and the cutting-rotation mechanism 42 rotates the cutter 44 to have an appropriate angle and cuts the cushion 9 such that a perpendicular cut surface is formed or cuts the cushion 9 obliquely to obtain a cut surface having a desired angle. Further, the cutting-oscillation mechanism 43 causes the cutter 44 to perform horizontally rectilinear oscillation sliding such that the cushion 9 is more smoothly cut.

Meanwhile, limit sensors 48 that limit lifting and lowering distances of the lifting/lowering body 42 are provided at an upper portion and a lower portion of a front surface of the cutting body 41*a* of the cutting lifting/lowering mechanism 41.

There is no need to provide the cushion cutting unit 4 when the cushion is used in a state of being cut in advance, and the cushions cut in different shapes are to be attached to the cutting plate 10 beside the blade portion depending on a shape of the blade portion of the cutting plate 10 when the cushions cut in advance are used. Further, when the cushions cut in advance are used, two or more cut cushions having different shapes from each other are supplied using a separate cartridge. Besides, when the cushions cut in advance are used, the cushion gripping/transporting unit transports the cushion to a location for attaching the cushion to the cutting plate without gripping and transporting the cut cushion to the cutting location.

Hereinafter, in the automatic cushion-attaching device according to the present disclosure configured as described above, work of cutting the cushion 9 by the cushion cutting device is to be briefly described.

First, when the cushion gripping/transporting unit 3 grips and transports the long cushion 9 supplied by the cushion supply unit 2 to the cutting location, the cushion transmitting unit 4 of the cushion cutting device of the present disclosure stands by to cut the cushion 9.

Next, the cutting lifting/lowering mechanism 41 of the cushion cutting unit 4 is lowered to the cutting location, and the cutter 44 at a lower side of the cutting lifting/lowering mechanism 41 cuts the cushion 9. Here, when the cushion 9 is obliquely cut to have a cut surface at a desired angle, the cushion is cut after both the cutting lifting/lowering mechanism 41 and the cutter 44 are rotated at a predetermined angle by the cutting-rotation mechanism 42 of the cushion cutting unit 4, and appropriate oscillation of the cutter 44 in the horizontal direction by the cutting-oscillation mechanism 43 of the cushion cutting unit 4 causes cutting work of the cushion 9 to be more easily performed.

Next, when cutting of one cushion 9 is completed, the cushion gripping/transporting unit 3 transports the cut cushion to a post-cutting location. Then, the cushion gripping/transporting unit 3 re-grips and transports the long cushion 9, which is left without being cut, to a cutting location, and cushion cutting work is subsequently performed by the cushion cutting unit 4 or the like.

With reference to FIGS. 1 and 2, in the automatic cushion-attaching device configured to include the plate transporting unit 1, the cushion supply unit 2, the cushion gripping/transporting unit 3, the cushion cutting unit 4, the attachment/transport unit 5, the cushion attaching unit 6, the adhesive applying unit 7, and the control unit 8, a cushion transporting/attaching device corresponds to the attachment/transport unit 5 and the cushion attaching unit 6. When the long cushion 9 is transported and supplied by the cushion supply unit 2 and the cushion gripping/transporting unit 3 to the cutting location which is the appropriate location, and the long cushion 9 is continually cut by appropriate lengths at the cutting location by the cushion cutting unit 4, the cut cushion is transported to the attachment/transport unit 5, and the cut cushion transported to the cushion attaching unit 6 is to be attached at a predetermined location of the cutting plate 10.

In this respect, detailed structures of and an operational relationship between the attachment/transport unit 5 and the cushion attaching unit 6 which correspond to the cushion transporting/attaching device in the automatic cushion-attaching device according to the present disclosure are to be described.

Figure 14:
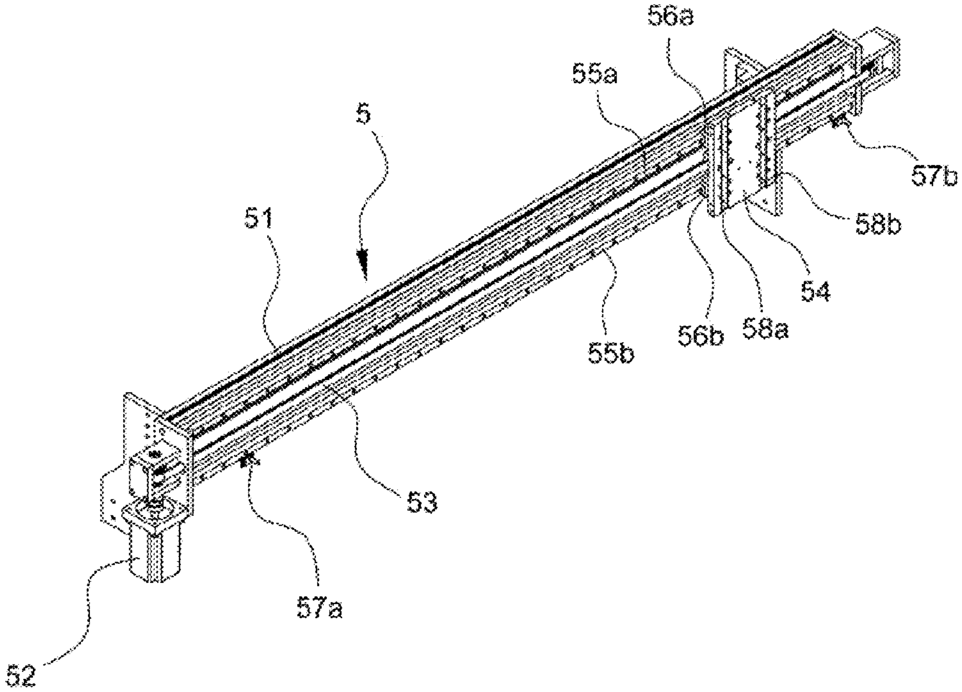
FIG. 14 is a perspective view illustrating an attachment/transport unit which configures a cushion transporting/attaching device in the automatic cushion-attaching device according to the present disclosure.

FIG. 14 is a perspective view illustrating the attachment/transport unit which configures the cushion transporting/attaching device in the automatic cushion-attaching device according to the present disclosure.

As illustrated in FIG. 3, the attachment/transport unit 5 is configured to include a transport frame 51, a drive transmitting mechanism 52 which uses a transport motor, a transport-driving mechanism 53, and a transport plate 54 and is provided in the width direction of the table frame 11, in front of the cushion gripping/transporting unit 3 at the opposite side thereof. A step motor or a servomotor, for example, is used as the transport motor. In other words, when the transport-driving mechanism 53 is provided in a shape of a drive belt having a long loop as a driving means along a central portion of the transport frame 51 in a longitudinal direction thereof, the transport frame being provided in the width direction of the table frame 11, the drive transmitting mechanism 52 as the transport motor which rotates the transport-driving mechanism 53 is connected to one end of the transport frame 51, a central portion of a rear surface of the transport plate 54 is connected to the transport-driving mechanism 53, and thereby the transport plate 54 is transported while horizontally reciprocating due to rotation of the transport-driving mechanism 53. Any mechanism can be used as the transport-driving mechanism 53 further to the drive belt as long as the mechanism is driven to perform rectilinear movement by being connected to the transport motor which is the drive transmitting mechanism 52 such as a transport means or a linear motor. A ball screw or a lead screw is representatively used as the transport means using the screw.

LM guides 55*a* and 55*b* as a transport guide are attached to an upper side and a lower side of a rear surface of the transport plate 54, respectively, and LM blocks 56*a* and 56*b* to which the LM guides 55*a* and 55*b* are coupled not to be decoupled therefrom are provided as the transport guides at an upper side and a lower side of a front surface of the transport frame 51. The transport plate 54 is transported while horizontally reciprocating in the width direction of the table frame 11 by the transport guide configured to include the LM guides 55*a* and 55*b* and the LM blocks 56*a* and 56*b*. Here, the drive belt is described only as an example of the transport-driving mechanism 53, and thus the transport-driving mechanism 53 can be transported by performing horizontal reciprocating motion in a different form of a chain or the like other than the drive belt. Further, the transport motor is described only as an example of the drive transmitting mechanism 52, and the drive transmitting mechanism can be provided in another form to cause the transport plate 54 to horizontally reciprocate. The transport plate 54 has sliding grooves 58*a* and 58*b* vertically formed at both sides of a front surface thereof.

Meanwhile, limit sensors 57*a* and 57*b* that limit a horizontal rightward-leftward movement distance of the transport plate 54 are provided at both ends of an undersurface of the transport frame 51.

Figure 15:
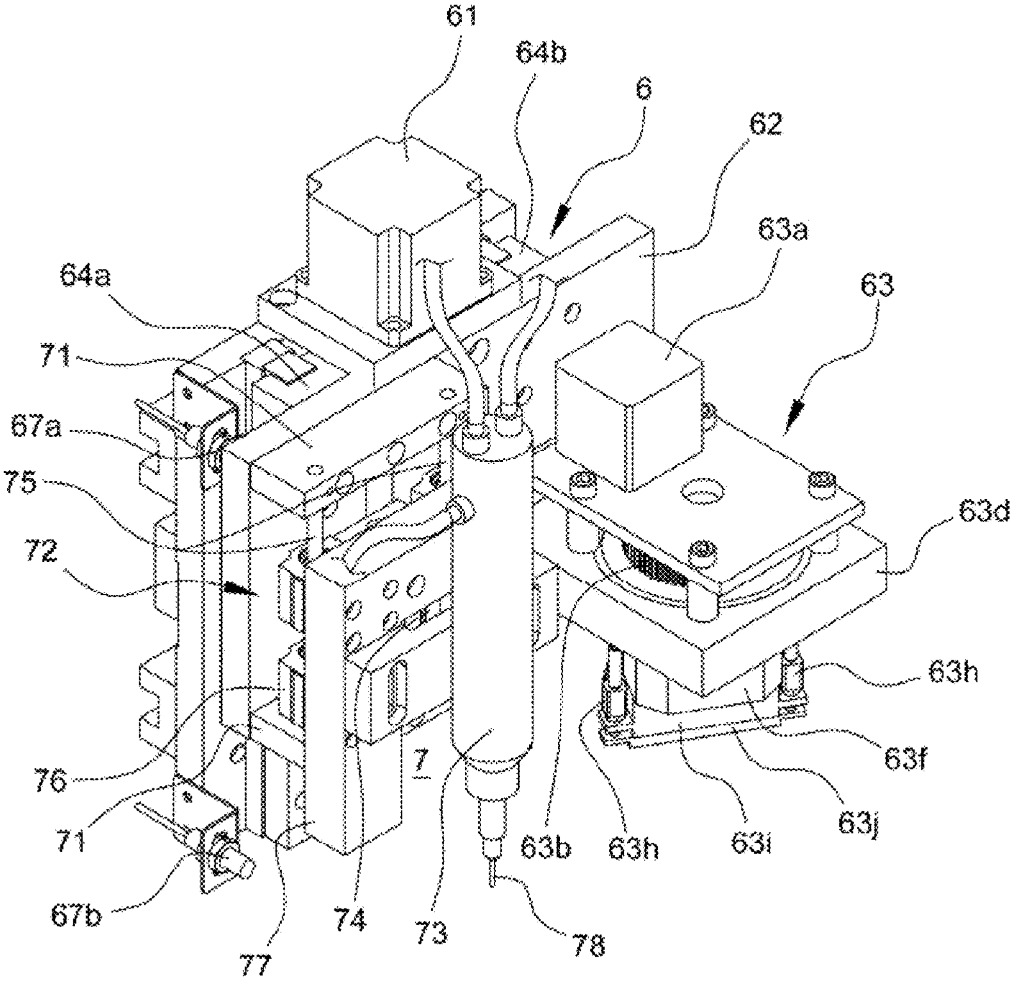
FIG. 15 is a perspective view illustrating a cushion attaching unit, which configures the cushion transporting/attaching device in the automatic cushion-attaching device according to the present disclosure, with an adhesive applying unit.
Figure 16:
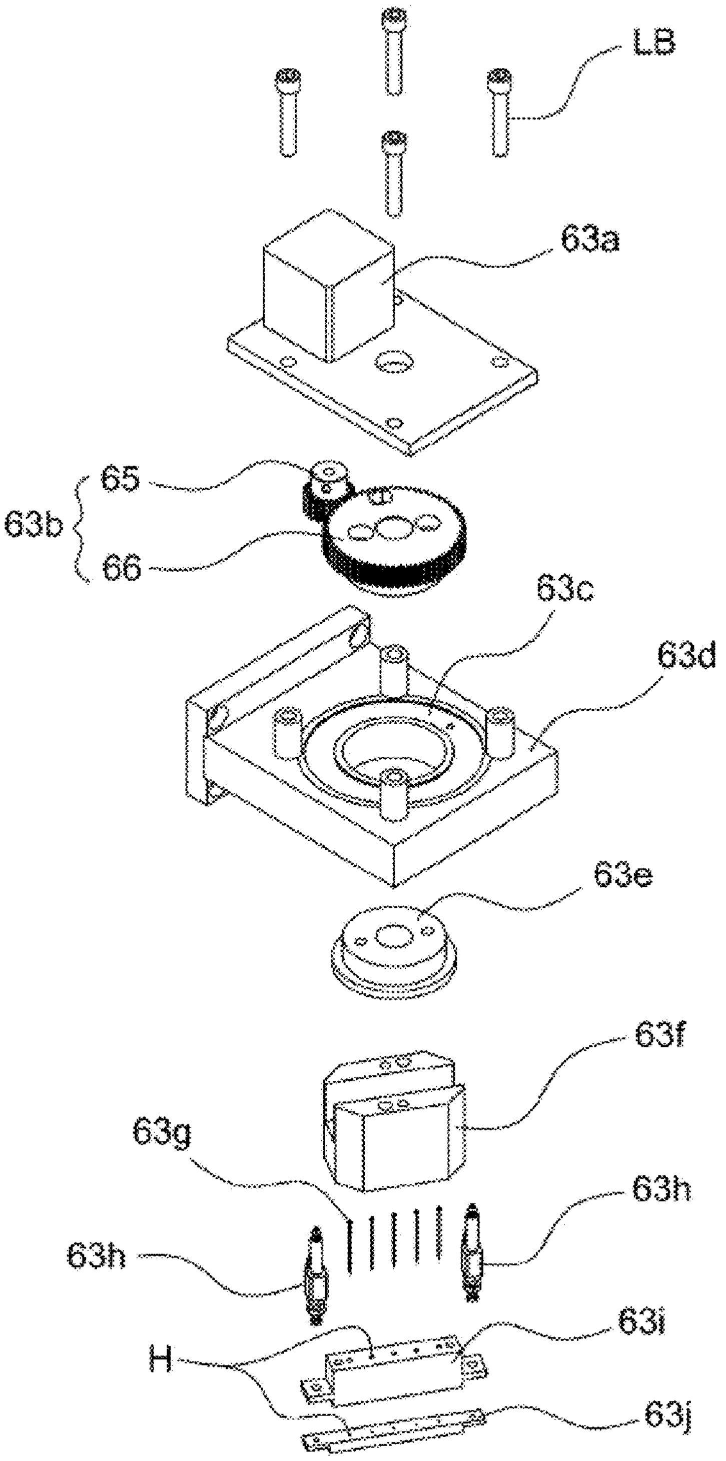
FIG. 16 is an exploded perspective view illustrating the cushion attaching unit which configures the cushion transporting/attaching device in the automatic cushion-attaching device according to the present disclosure.

FIG. 15 is a perspective view illustrating the cushion attaching unit, which configure the cushion transporting/attaching device in the automatic cushion-attaching device according to the present disclosure, with the adhesive applying unit, and FIG. 16 is an exploded perspective view illustrating the cushion attaching unit which configures the cushion transporting/attaching device in the automatic cushion-attaching device according to the present disclosure.

As illustrated in FIGS. 15 and 16, the cushion attaching unit 6 is slidably coupled to the front surface of the transport plate 54 of the transport/attachment unit 51 and is configured to include a lifting/lowering plate 62 to which an attachment lifting/lowering motor 61 is coupled at a central portion of a rear surface thereof and an attachment lifting/lowering mechanism 63 which is attached at one side of a front surface of the lifting/lowering plate 62. Sliding rails 64*a* and 64*b* attached vertically to both sides of a rear surface of the lifting/lowering plate 62 are slidably coupled to the sliding grooves 58*a* and 58*b* formed at both sides of the front surface of the transport plate 54. A step motor or a servomotor, for example, is used as the attachment lifting/lowering motor 61. Consequently, when the lifting/lowering plate 62 is lifted and lowered by the attachment lifting/lowering motor 61 while the lifting/lowering plate slides vertically, the attachment lifting/lowering mechanism 63 attached to the lifting/lowering plate 62 also performs lifting and lowering movement together.

The attachment lifting/lowering mechanism 63 is configured to have an attachment/rotation motor 63*a*, a gear assembly 63*b*, an attachment body 63*d* to which the attachment/rotation bearing 63*c* is coupled, a rotation transmitting plate 63*e*, a cylinder mounting block 63*f*, transport needles 63*g*, press cylinders 63*h*, a press block 63*i*, and a press plate 63*j* in broad division. A step motor or a servomotor, for example, is used as the attachment/rotation motor 63*a*. In a state where the gear assembly 63*b* is coupled to the attachment/rotation bearing 63*c* of the attachment body 63*d*, the attachment/rotation motor 63*a* is coupled to an upper side of the attachment body 63*d* with wrench bolts LB. Further, the rotation transmitting plate 63*e* and the cylinder mounting block 63*f* are coupled, in this order, to the attachment/rotation bearing 63*c* provided at a lower side of the attachment body 63*d*, and multiple transport needles 63*g* are attached at regular intervals to an undersurface of the cylinder mounting block 63*f*. Subsequently, the press cylinders 63*h* are attached to both side surfaces of the cylinder mounting block 63*f*, respectively, and both sides of the press block 63*i* and the press plate 63*j* under the press cylinder 63*h* are connected to the press cylinders 63*h*, respectively. Here, the press block 63*i* and the press plate 63*j* are disposed below the transport needles 63*g* and have multiple through-holes H formed at regular intervals through which the transport needles 63*g* pass, respectively. The gear assembly 63*b* is configured to include a small transmission gear 65 connected to a motor shaft of the attachment/rotation motor 63*a* and a large rotation gear 66 meshed with the small transmission gear 65, and the large rotation gear 66 is coupled to the attachment/rotation bearing 63*c*. The attachment lifting/lowering mechanism 63 is more specifically divided into an attachment cylinder unit including the cylinder mounting block 63*f*, the press cylinders 63*h*, the press block 63*i*, and the press plate 63*j* and an attachment/rotation unit including the attachment/rotation motor 63*a*, the gear assembly 63*b*, the attachment body 63*d* to which the attachment/rotation bearing 63*c* is coupled, and the rotation transmitting plate 63*e*.

As described above, the attachment/transport unit 63 attached to the transport plate 54 of the attachment/transport unit 5 is transported while horizontally reciprocating by a configuration of the cushion attaching unit 6 described above, and the attachment lifting/lowering mechanism 63 is coupled to the lifting/lowering plate 62 connected to the transport plate 54 to perform vertically lifting and lowering motion. Consequently, the transport needles 63*g* of the attachment lifting/lowering mechanism 63 prick the cut cushion 9 placed at the other side of the grip rail 31 of the gripping/transporting 3, and the cushion 9 is transported to the cutting plate 10 by the transport plate 54 of the attachment/transport unit 5. After the press cylinders 63*h* of the attachment lifting/lowering mechanism 63 lower the press block 63*i* and the press plate 63*j* downward, and the cut cushion 9 is separated from the transport needles 63*g*, the cut cushion 9 is pressed by the press plate 63*j* and is attached to a predetermined location of the cutting plate 10 to which an adhesive is applied. At this time, the cut cushion 9 pricked and held by the transport needles 63*g* is rotated at an appropriate angle and is attached by the attachment/rotation unit of the attachment/rotation motor 63*a*, the gear assembly 63*b*, and the like. Here, horizontal reciprocation of the cushion attaching unit 6 is performed by the transport frame 51 and the transport plate 54 of the attachment/transport unit 5; however, rotation and lifting and lowering motion of the cushion attaching unit 6 are independently performed by an internal function thereof.

The control unit 8 is configured of a type of a PC, is electrically connected to all of the units described above, and controls all of the operations such as transport through the horizontal reciprocating motion of the units and cushion attaching work through the vertical lifting and lowering motion. Further, the control unit controls operations of the units of the cushion transporting/attaching device of the present disclosure.

The predetermined location is a location in the vicinity of both side surfaces of the blade portion of the cutting plate which is placed on the cutting plate 10 along an outline of a planar figure so as to cut paper, cloth, vinyl, synthetic resin, and the like. In other words, the predetermined location is a location close to the cushion 9 between the cushions 9 at both sides.

Meanwhile, limit sensors 67*a* and 67*b* that limit lifting and lowering distances of the transport plate 54 are provided at an upper portion and a lower portion at one side of a front surface of the transport plate 54 of the attachment/transport unit 5.

Meanwhile, when a material of the cushion 9 needs to have a certain degree of elasticity, the material can be selected from various materials, and any one material of sponge, rubber, cork, and synthetic resin is selected to be used, mainly.

Next, work of transporting and attaching the cut cushion 9 to the cutting plate 10 by the cushion transporting/attaching device of the present disclosure which is configured as described above is to be briefly described.

First, as the cutting plate 10 is supplied onto the table frame 11 of the plate transporting unit 1, the long cushion 9 is supplied by the cushion supply unit 2, and the long cushion 9 is moved by the cushion gripping/transporting unit 3 to the cutting location and comes into a standby state. Then, the long cushion 9 is cut by appropriate lengths by the cushion cutting unit 4 and is horizontally moved again by the cushion gripping/transporting unit 3 to a location of the attachment/transport unit 5.

Next, the cushion attaching unit 6 is transported toward the cut cushion 9 by the transport of the attachment/transport unit 5 of the cushion transporting/attaching device of the present disclosure. Here, as the attachment lifting/lowering mechanism 63 of the cushion attaching unit 6 is lowered, the transport needles 63*g* at the lower side thereof prick the cut cushion 9 and are lifted.

Next, the attachment lifting/lowering mechanism 63, which pricks the cut cushion 9 and is lifted, returns to a location above the cutting plate 10 placed on the table frame 11 of the plate transporting unit 1 due to the transport of the attachment/transport unit 5, and the attachment lifting/lowering mechanism prepares attachment of the cushion 9.

Next, the attachment lifting/lowering mechanism 63 holding the cut cushion 9 pricked by the transport needles 63*g* is lowered to a location on the cutting plate 10 to which the adhesive is applied by the adhesive applying unit 7, and the cushion 9 is attached to the location. Here, the cut cushion 9 is rotated at an appropriate angle by the cutting-rotation mechanism 42 to match the angles of different cut surfaces and is attached to the cutting plate 10, and then the attachment lifting/lowering mechanism is lifted. This work procedure is repeatedly conducted until the cut cushions 9 are all attached to the predetermined locations of the cutting plate 10.

With reference to FIGS. 1 and 2, in the automatic cushion-attaching device configured to include the plate transporting unit 1, the cushion supply unit 2, the cushion gripping/transporting unit 3, the cushion cutting unit 4, the attachment/transport unit 5, the cushion attaching unit 6, the adhesive applying unit 7, and the control unit 8, the adhesive applying device corresponds to the adhesive applying unit 7 and the adhesive applying unit 7 is configured to include an application providing mechanism 71, an application lifting/lowering mechanism 72, and an adhesive supply mechanism 73. Consequently, while the application lifting/lowering mechanism 72 coupled to the application providing mechanism 71 is lifted and lowered, an adhesive is applied, before the cushion 9 is attached thereto, by the adhesive supply mechanism 73 attached to the application lifting/lowering mechanism 72 at a predetermined location of the cutting plate 10 to which the cushion 9 is attached.

Here, the predetermined location is the same as described above.

In this respect, detailed structures of and operational relationships between the application providing mechanism 71, the application lifting/lowering mechanism 72, and the adhesive supply mechanism 73 of the adhesive applying unit 7 corresponding to the adhesive applying device in the automatic cushion-attaching device according to the present disclosure are to be described.

Figure 17:
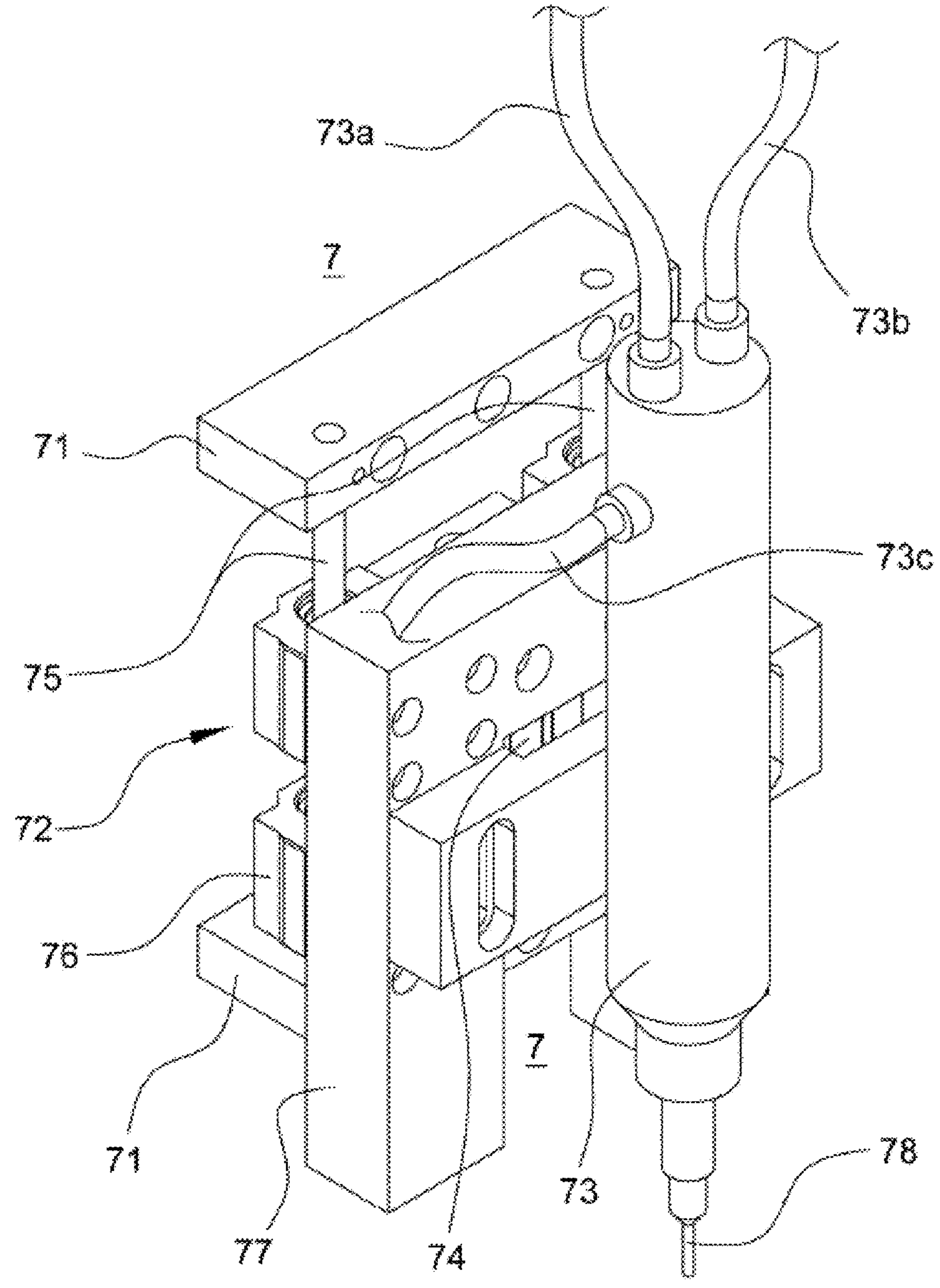
FIG. 17 is a perspective view illustrating the adhesive applying unit which configures an adhesive applying device in automatic cushion-attaching device according to the present disclosure.
Figure 18:
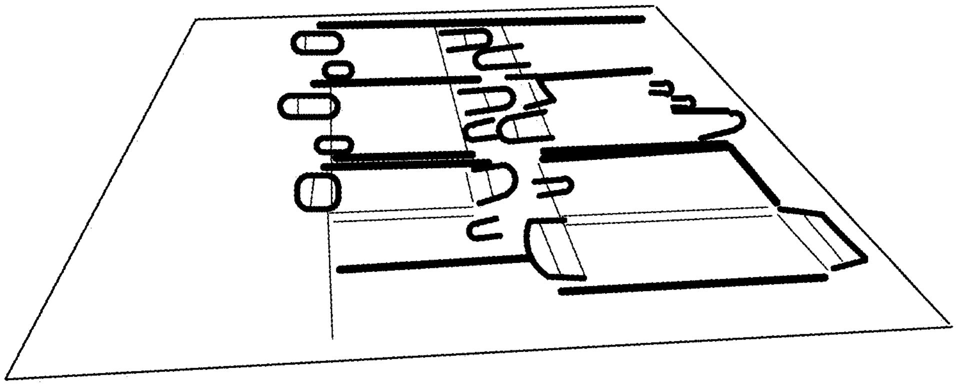
FIG. 18 is a picture illustrating a method in the related art in which a worker himself or herself attaches cushions to a cutting plate.
Figure 19:
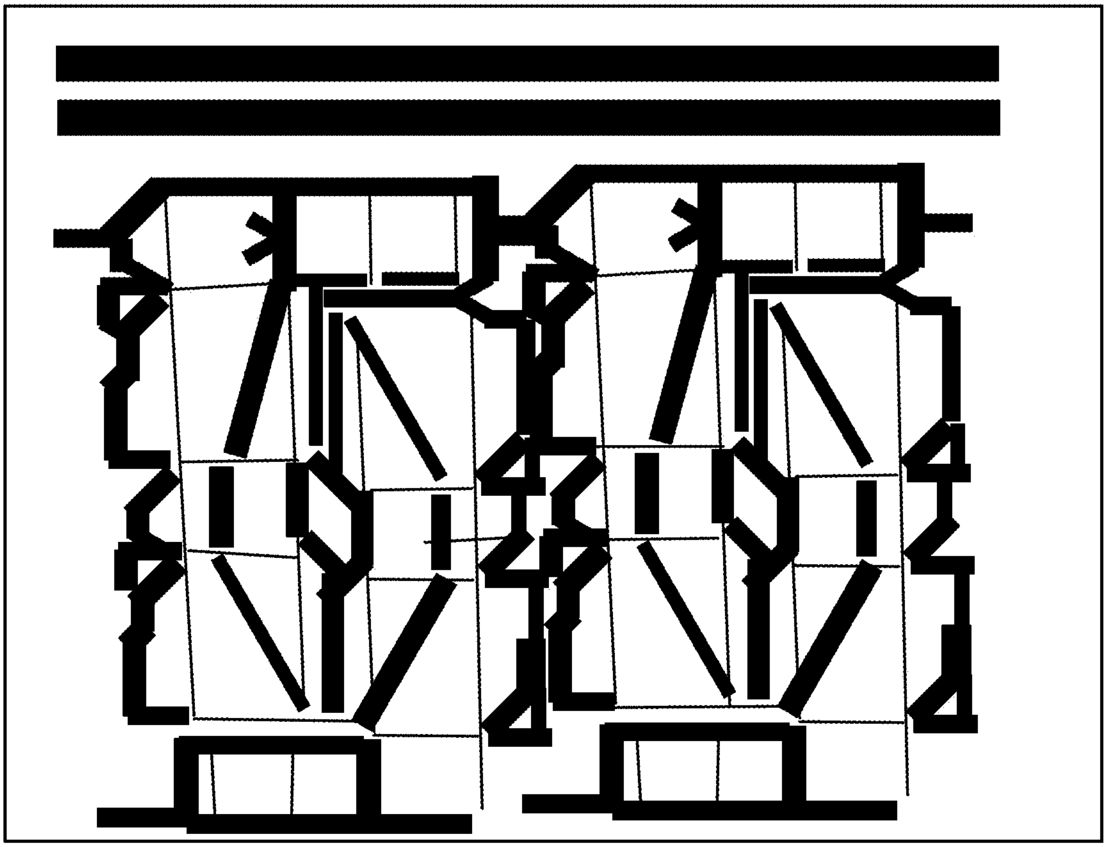
FIG. 19 is a picture illustrating a state where cushions are attached to a cutting plate in a specific shape.

FIG. 15 is a perspective view illustrating the cushion attaching unit, which configures the cushion transporting/attaching device in the automatic cushion-attaching device according to the present disclosure, with the adhesive applying unit, and FIG. 17 is a perspective view illustrating the adhesive applying unit which configures the adhesive applying device in the automatic cushion-attaching device according to the present disclosure.

As illustrated in FIGS. 15 and 17, the adhesive applying unit 7 corresponding to the adhesive applying device in the automatic cushion-attaching device according to the present disclosure includes the application providing mechanism 71 which is provided at a front surface of the attachment/transport unit 5 as one unit of the cushion transporting/attaching device, the application lifting/lowering mechanism 72 which is coupled to a front surface of the application providing mechanism 71 and is provided to be lifted and lowered above the cutting plate 10, and the adhesive supply mechanism 73 which is connected to a front surface of the application lifting/lowering mechanism 72 and supplies an adhesive while being lifted and lowered together with the application lifting/lowering mechanism 72 such that the adhesive is applied to a predetermined location of the cutting plate 10.

The application providing mechanism 71 is attached in a projecting shape to both an upper portion and a lower portion at one side of the front surface of the lifting/lowering plate 62 of the cushion attaching unit 6 as the other unit of the cushion transporting/attaching device, and the attachment lifting/lowering mechanism 63 is attached to the other side of the front surface of the lifting/lowering plate 62. Meanwhile, to more specifically describe a mounting position of the application providing mechanism 71, the application providing mechanism is mounted together with the attachment lifting/lowering mechanism 63, which is one mechanism of the cushion attaching unit 6, on the lifting/lowering plate 62 of the cushion attaching unit 6 that is provided at the attachment/transport unit 5 and horizontally moved together with the attachment/transport unit 5 which is horizontally moved above the cutting plate 10.

The application lifting/lowering mechanism 72 is configured to include an application lifting/lowering cylinder 74, application lifting/lowering shafts 75, application lifting/lowering blocks 76, and an application lifting/lowering plate 77 and is provided between an upper portion and the lower portion of the application providing mechanism 71.

The application lifting/lowering cylinder 74 is vertically provided at a center of the front surface of the application providing mechanism 71, the application lifting/lowering shafts 75 connected to the application lifting/lowering cylinder 74 are provided in a vertically long shape at both sides of the application providing mechanism 71, respectively, and the application lifting/lowering blocks 76 are coupled to the respective application lifting/lowering shafts 75 on axes thereof.

The adhesive supply mechanism 73 is connected to the application lifting/lowering mechanism 72 in an air cylinder shape as a constant delivery device. Hence, when the application lifting/lowering shaft 75 is lifted or lowered by the application lifting/lowering cylinder 74 of the application lifting/lowering mechanism 72, the adhesive supply mechanism 73 also performs vertically lifting or lowering movement together with the application lifting/lowering shaft. The adhesive supply mechanism 73 is provided in a form of air valve which is used as the constant delivery device, thus the adhesive supply mechanism 73 has a configuration in which an air supply tube 73*a* and an air emitting tube 73*b* are both connected to an upper portion of the air valve, and an adhesive supply tube 73*c* which supplies an adhesive is connected to a lower portion of a side surface of the air valve.

The control unit 8 is configured of a type of a PC, is electrically connected to all of the mechanisms described above, and controls all of the operations such as transport through the horizontal reciprocating motion of the mechanisms and the cushion attaching work through the vertical lifting and lowering motion. Further, the control unit controls operations of the mechanisms of the adhesive applying device of the present disclosure.

Next, work of applying the adhesive to the predetermined location by the adhesive applying device of the present disclosure which is configured as described above before the cut cushion 9 is attached to the cutting plate 10 is to be briefly described.

When the application lifting/lowering block 76 nut-coupled to the application lifting/lowering shaft 75 is vertically lifted or lowered due to an operation of the application lifting/lowering cylinder 74 of the application lifting/lowering mechanism 72 provided at the application providing mechanism 71 which configures the adhesive applying unit 7, the application lifting/lowering plate 77 connected to the application lifting/lowering block 76 also performs vertically lifting or lowering motion together with the application lifting/lowering block.

In this manner, the adhesive supply mechanism 73 is attached to a front surface of the application lifting/lowering plate 77 in a form of air valve, and thus an adhesive is supplied into the air valve through the adhesive supply tube 73*c* when air is supplied through the air supply tube 73*a* as the air valve of the adhesive supply mechanism 73 is also lifted or lowered.

Consequently, as the adhesive supplied into the air valve of the adhesive supply mechanism 73 is discharged by a constant amount through a nozzle 78, the adhesive is applied to the predetermined location of the cutting plate 10. When application based on discharge of the adhesive is completed and the adhesive needs not to be discharged, air is emitted through the air emitting tube 73*b* to the outside of the air valve of the adhesive supply mechanism 73.

Meanwhile, collectively, the control unit 8 is configured of a type of a PC, is electrically connected to all of the units described above, and controls all of the operations such as transport through the horizontal reciprocating motion of the units and the cushion attaching work through the vertical lifting and lowering motion.

Next, work of cutting the cushion 9 and attaching the cut cushion 9 to the cutting plate 10 by the automatic cushion-attaching device of the present disclosure which is configured as described above is to be briefly described in general.

First, when the cutting plate 10 is supplied onto the table frame 11 of the plate transporting unit 1, the entry sensor 16 detects the cutting plate, and supply, cutting, transport, attachment, and the like of the cushion 9 are processed in the following procedure.

Next, when, of three cushions supplied to the supply rail 21 of the cushion supply unit 2, any one cushion is selected by horizontal movement of the selective supply unit 22 and is caused to face the cushion gripping/transporting unit 3, the grip clamp 33 of the cushion gripping/transporting unit 3 horizontally moves to a location below the selective supply unit 22 on the grip rail 31, grips the end of the cushion 9, and returns to the cutting location 34 on the grip rail 31 by horizontal movement.

Next, the cutting lifting/lowering mechanism 41 of the cushion cutting unit 4 is lowered to the cutting location 34, and the cutter 44 at a lower side of the cutting lifting/lowering mechanism 41 cuts the cushion 9. Here, when the cushion 9 is obliquely cut to have a cut surface at a desired angle, the cushion is cut after both the cutting lifting/lowering mechanism 41 and the cutter 44 are rotated at a predetermined angle by the cutting-rotation mechanism 42 of the cushion cutting unit 4, and appropriate oscillation of the cutter 44 in the horizontal direction by the cutting-oscillation mechanism 43 of the cushion cutting unit 4 causes the cutting work of the cushion 9 to be more easily performed.

Next, when the grip clamp 33 of the cushion gripping/transporting unit 3 grips the cut cushion 9 and horizontally moves toward the cushion attaching unit 6, the cushion attaching unit 6 is transported toward the cut cushion 9 by the transport of the attachment/transport unit 5. Here, as the attachment lifting/lowering mechanism 63 of the cushion attaching unit 6 is lowered, the transport needles 63*g* at the lower side thereof prick the cut cushion 9 and are lifted.

Next, the attachment lifting/lowering mechanism 63, which pricked the cut cushion 9 and is lifted, returns to a location above the cutting plate 10 placed on the table frame 11 of the plate transporting unit 1 due to the transport of the attachment/transport unit 5, and the attachment lifting/lowering mechanism prepares attachment of the cushion 9.

Next, the adhesive supply mechanism 73 is lowered onto the cutting plate 10 by the application lifting/lowering mechanism 72 of the adhesive applying unit 7, and the adhesive is applied in advance by the adhesive supply mechanism 73 to the predetermined location of the cutting plate 10 at which the cushion 9 needs to be attached, before the cut cushion 9 is attached to the cutting plate 10.

Next, the attachment lifting/lowering mechanism 63 holding the cut cushion 9 pricked by the transport needles 63*g* is lowered to the location on the cutting plate 10 to which the adhesive is applied, and the cushion 9 is attached to the location. Here, the cut cushion 9 is rotated at an appropriate angle by the cutting-rotation mechanism 42 to match the angles of different cut surfaces and is attached to the cutting plate 10, and then the attachment lifting/lowering mechanism is lifted. This work procedure is repeatedly conducted until the cut cushions 9 are all attached to the predetermined locations of the cutting plate 10.

INDUSTRIAL APPLICABILITY

According to the present disclosure, work of attaching cushions to the cutting plate is automatically performed by one machine, and thus an effect of a significant increase in attachment speed is obtained. Further, the increase in attachment speed significantly increases productivity of the cutting plate, and thus the present disclosure can be effectively used as the automatic cushion-attaching device that automatically attaches a cushion to the cutting plate.

Further, since cushion attaching work is automatically performed, there is no need to employ an additional worker for cushion attachment such that labor cost is significantly saved, and thus the present disclosure can be effectively used as the automatic cushion-attaching device that automatically attaches a cushion to a cutting plate.

Further, since the cushion attaching work is performed by a precision machine, a cushion can be attached to an accurate location at which the cushions are to be attached even when the location has a complicated shape such that an error rate can be significantly reduced, and thus the present disclosure can be effectively used as the automatic cushion-attaching device that automatically attaches a cushion to a cutting plate.

The invention claimed is:

1. An automatic cushion-attaching device that cuts and attaches cushions or attaches cut cushions to a cutting plate along both sides of a location at which a blade portion is placed on the cutting plate, wherein two or more cushions to be attached are automatically attached to locations of the cutting plate beside the blade portion in a shape of the blade portion; and an adhesive applying unit that applies an adhesive to the cutting plate such that cut cushions are attached to the cutting plate.

2. The automatic cushion-attaching device according to claim 1, wherein the cushions are attached to the cutting plate depending on angles of different cut surfaces of the cut cushions.

3. The automatic cushion-attaching device according to claim 1, wherein the cushions which are cut into different shapes in advance are attached to the cutting plate at side surfaces of the blade portion depending on a shape of the blade portion.

4. The automatic cushion-attaching device according to claim 1, comprising:

a cushion supply unit that supplies at least one of the cushions.

5. The automatic cushion-attaching device according to claim 4, further comprising:

a cushion gripping/transporting unit that grips one of the cushions supplied by the cushion supply unit, transports the one cushion to a cutting location, and transports a cut cushion to a transport location.

6. The automatic cushion-attaching device according to claim 4, wherein the cushion supply unit is configured to include a supply rail and a selective supply unit in front of the supply rail.

7. The automatic cushion-attaching device according to claim 6, wherein the cushion supply unit is a supply device that supplies a cushion which is to be attached to the cutting plate beside the blade portion of the cutting plate, and the cushion supply unit supplies one or more cushions and transports one of the one or more supplied cushions to an appropriate location.

8. The automatic cushion-attaching device according to claim 7, wherein the appropriate location is a cutting location at which the one cushion is cut and a post-cutting location.

9. The automatic cushion-attaching device according to claim 7, wherein the supply device further includes:

a cushion supply unit on which one or more cushions are supplied;

a selective supply unit connected to the cushion supply unit; and a selection/transport unit that is provided at the selective supply unit and moves the selective supply unit in a width direction of the cushion supply unit.

10. The automatic cushion-attaching device according to claim 7, wherein the cushion supply unit is configured of a form of a supply rail in which a plurality of cushions are arranged at regular intervals and are supplied and one side of each of the cushions reaches the selective supply unit.

11. The automatic cushion-attaching device according to claim 9, wherein the selection/transport unit is configured of a step motor or a servomotor, and a motor shaft of the step motor or the servomotor is connected to the selective supply unit.

12. The automatic cushion-attaching device according to claim 9, wherein the supply device is provided at a plate transporting unit to face the selective supply unit and further includes a cushion gripping/transporting unit that transports a cushion to a cutting location and a post-cutting location, the cushion being selectively supplied depending on movement of the selective supply unit by the selection/transport unit.

13. The automatic cushion-attaching device according to claim 12, wherein the cushion gripping/transporting unit is configured to include:

a grip table;

a grip rail which is provided on the grip table;

a grip clamp which is provided on the grip rail; and a grip motor which is provided on the grip table at one side of the grip rail and is connected to the grip clamp to move the grip clamp on the grip rail.

14. The automatic cushion-attaching device according to claim 4, wherein the cushion supply unit has a shape of a cushion cartridge to which two or more cushions which are cut into different shapes in advance are supplied.

15. The automatic cushion-attaching device according to claim 14, further comprising:

a cushion gripping/transporting unit that grips one of the cushions supplied by the cushion supply unit and transports the one cushion to a location of the blade portion on the cutting plate.

16. The automatic cushion-attaching device according to claim 1, comprising:

a cushion cutting unit that cuts the cushions.

17. The automatic cushion-attaching device according to claim 16, wherein the cushion cutting unit is a device that cuts a cushion which is to be attached to the cutting plate along both sides of the location at which the blade portion is placed on the cutting plate, and the cushion cutting unit which is lifted and lowered above the cushion cuts a cushion transported to a cutting location by a certain length.

18. The automatic cushion-attaching device according to claim 16, wherein the cushion cutting unit, which rotates, cuts a cushion to have a cut surface at an angle of various angles of cut surfaces.

19. The automatic cushion-attaching device according to claim 16, wherein the cushion cutting unit, which oscillates, assists cutting of a cushion.

20. The automatic cushion-attaching device according to claim 16, wherein the cushion cutting unit includes a cutting lifting/lowering mechanism which is lifted and lowered above a cutting location and a cutter which is connected to a lower part of the cutting lifting/lowering mechanism.

21. The automatic cushion-attaching device according to claim 20, wherein the cushion cutting unit further includes a cutting-rotation mechanism that is included in the cutting lifting/lowering mechanism and rotates the cutting lifting/lowering mechanism together with the cushion cutting unit.

22. The automatic cushion-attaching device according to claim 20,
wherein the cushion cutting unit further includes a cutting-oscillation mechanism that is connected to a center of the cutting lifting/lowering mechanism and causes the cutter to oscillate.

23. The automatic cushion-attaching device according to claim 22,
wherein the cutting-oscillation mechanism includes:
an eccentric shaft which is connected to the center of the cutting lifting/lowering mechanism and rotates;
an eccentric plate which has a long hole at a central portion and into which the eccentric shaft is inserted; and
an oscillation body which is coupled to the eccentric plate and oscillates rectilinearly due to eccentric rotation of the eccentric shaft.

24. The automatic cushion-attaching device according to claim 23, further comprising:
a fixing plate that is connected to the cutting lifting/lowering mechanism to move while the cutter is inserted into and penetrate the fixing plate at a central portion.

25. The automatic cushion-attaching device according to claim 1, comprising:
an attachment/transport unit that transports and attaches cut cushions to the cutting plate.

26. The automatic cushion-attaching device according to claim 25,
wherein the attachment/transport unit is a device that transports cut cushions to attach the cushions to a predetermined location on the cutting plate along both sides of the location at which the blade portion is placed on the cutting plate, and the attachment/transport unit transports the cut cushions to the predetermined location of the cutting plate.

27. The automatic cushion-attaching device according to claim 25, further comprising:
a cushion attaching unit that is connected to the attachment/transport unit and attaches the transported cushions to the predetermined location of the cutting plate.

28. The automatic cushion-attaching device according to claim 27, wherein the attachment/transport unit is configured to include:
a transport frame which is provided at a plate transporting unit which is disposed to mount the automatic cushion-attaching device;
a drive transmitting mechanism which is provided at the transport frame;
a transport-driving mechanism which is connected to the drive transmitting mechanism and is transported in a width direction of the plate transporting unit;
a transport plate having a rear surface which is connected to the transport-driving mechanism; and
transport guides which are each connected to the transport frame.

29. The automatic cushion-attaching device according to claim 28,
wherein the transport guides are each configured to include LM blocks which are provided at an upper side and a lower side of the transport frame, respectively, and LM guides which are formed at an upper side and a lower side of a rear surface of the transport plate and are coupled to the LM blocks.

30. The automatic cushion-attaching device according to claim 28,
wherein the attachment/transport unit is to be also transported in a longitudinal direction of the plate transporting unit.

31. The automatic cushion-attaching device according to claim 28,
wherein the cushion attaching unit includes an attachment lifting/lowering mechanism which is connected to a transport/attachment unit to be lifted and lowered, and the attachment lifting/lowering mechanism includes an attachment cylinder unit that grips a cut cushion which is transported and an attachment/rotation unit that rotates the attachment cylinder unit.

32. The automatic cushion-attaching device according to claim 31,
wherein the attachment cylinder unit is configured to include:
a cylinder mounting block;
press cylinders which are attached to both sides of the cylinder mounting block, respectively;
a press block which is coupled to a lower end of the press cylinder at both sides of the press block and has multiple through-holes through which transport needles pass; and
a press plate which is coupled to the lower end of the press cylinder at both sides of the press plate together with the press block and has multiple through-holes through which transport needles pass.

33. The automatic cushion-attaching device according to claim 31,
wherein the attachment/rotation unit is configured to include:
an attachment/rotation motor;
a gear assembly which is connected to a motor shaft of the attachment/rotation motor;
an attachment body which is coupled to an attachment/rotation hearing into which the gear assembly is inserted; and
a rotation transmitting plate which is coupled to the attachment/rotation hearing at an undersurface of the attachment body.

34. The automatic cushion-attaching device according to claim 1, wherein the adhesive applying unit is a device that applies an adhesive such that cushions are attached to the cutting plate along both sides of the location at which the blade portion is provided on the cutting plate, and the adhesive applying unit applies the adhesive to a predetermined location of the cutting plate before the cushions are attached.

35. The automatic cushion-attaching device according to claim 1, wherein the adhesive applying unit is configured to include:
an application providing mechanism;
an application lifting/lowering mechanism which is coupled to a front surface of the application providing mechanism and is lifted and lowered; and
an adhesive supply mechanism which is provided at a front surface of the application lifting/lowering mechanism and supplies an adhesive.

36. The automatic cushion-attaching device according to claim 35,
wherein the application providing mechanism of the adhesive applying unit is attached to a lifting/lowering plate of the cushion attaching unit which is horizontally moved together by the transport/attachment unit which is horizontally moved on the cutting plate.

37. The automatic cushion-attaching device according to claim 1, wherein the device is configured to include:

a plate transporting unit on which the cutting plate is transported;

a cushion supply unit which is connected to the plate transporting unit and on which one or more cushions are supplied;

a cushion gripping/transporting unit which is connected to the plate transporting unit and transports a cushion which is supplied by the cushion supply unit;

a cushion cutting unit that is connected to the cushion gripping/transporting unit and cuts a transported cushion;

an attachment/transport unit which is provided at the plate transporting unit and is transported;

a cushion attaching unit that is connected to the attachment/transport unit and attaches a cut cushion to the cutting plate;

an adhesive applying unit which is provided at the cushion attaching unit; and a control unit which controls all operations of the units.

38. The automatic cushion-attaching device according to claim 37, wherein the plate transporting unit is configured to include:

a table frame;

multiple roller bars which are provided at the table frame;

a rotational close-contact mechanism which is provided at the table frame and with which one side surface of the cutting plate comes into close contact;

a transport/close-contact mechanism which is provided at each of the roller bars; and a close-contact transporting mechanism which transports the transport/close-contact mechanism.

39. The automatic cushion-attaching device according to claim 26, wherein the predetermined location is a location on the cutting plate which approaches the blade portion along both side surfaces of the blade portion of the cutting plate which is provided on the cutting plate.

* * * * *